(12) United States Patent
Chen

(10) Patent No.: US 11,079,570 B2
(45) Date of Patent: Aug. 3, 2021

(54) PHOTOGRAPHING OPTICAL LENS ASSEMBLY AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 299 days.

(21) Appl. No.: 16/182,451

(22) Filed: Nov. 6, 2018

(65) Prior Publication Data

US 2019/0384036 A1 Dec. 19, 2019

(30) Foreign Application Priority Data

Jun. 15, 2018 (TW) .................. 107120780

(51) Int. Cl.
*G02B 9/60* (2006.01)
*G02B 9/64* (2006.01)
*G02B 27/00* (2006.01)

(52) U.S. Cl.
CPC ........... *G02B 9/64* (2013.01); *G02B 27/0025* (2013.01)

(58) Field of Classification Search
CPC ....... G02B 9/60; G02B 13/0045; G02B 13/18
See application file for complete search history.

(56) References Cited

U.S. PATENT DOCUMENTS

| | | | | |
|---|---|---|---|---|
| 2013/0308206 A1* | 11/2013 | Hsu | ................... | G02B 13/0045 359/714 |
| 2015/0362703 A1* | 12/2015 | Park | ................... | G02B 13/0045 359/713 |
| 2015/0370039 A1 | 12/2015 | Bone | | |

FOREIGN PATENT DOCUMENTS

| | | |
|---|---|---|
| CN | 106959500 A | 7/2017 |
| CN | 108107549 A | 6/2018 |
| CN | 108152923 A | 6/2018 |
| CN | 108459393 A | 8/2018 |
| CN | 108459394 A | 8/2018 |
| TW | 201827877 A | 8/2018 |

* cited by examiner

*Primary Examiner* — Joseph P Martinez
(74) *Attorney, Agent, or Firm* — Maschoff Brennan

(57) ABSTRACT

A photographing optical lens assembly includes five lens elements which are, in order from an object side to an image side: a first lens element, a second lens element, a third lens element, a fourth lens element and a fifth lens element. The first lens element has an object-side surface being convex in a paraxial region thereof. The third lens element has an object-side surface being convex in a paraxial region thereof. The fifth lens element has an image-side surface being concave in a paraxial region thereof, and the image-side surface of the fifth lens element has at least one convex shape in an off-axis region thereof.

12 Claims, 22 Drawing Sheets

PHOTOGRAPHING OPTICAL LENS ASSEMBLY AND ELECTRONIC DEVICE

RELATED APPLICATIONS

This application claims priority to Taiwan Application 107120780, filed on Jun. 15, 2018, which is incorporated by reference herein in its entirety.

BACKGROUND

Technical Field

The present disclosure relates to a photographing optical lens assembly and an electronic device, more particularly to a photographing optical lens assembly applicable to an electronic device.

Description of Related Art

With the development of electronic device technology, a miniaturized electronic device having photographing or detecting functions has been applied to various applications. A majority of optical systems are operated within a wavelength range of visible light, but when being applied to some application fields such as detection, recognition and identification, an optical system may be operated within a wavelength range of invisible light (e.g., infrared light) other than that of visible light. However, in general, due to low intensity of invisible light emitted from imaged objects, the optical system usually works with an additional infrared light source to illuminate the environments so as to be able to capture images or detect the objects.

Since a conventional wavelength range of infrared light, where the optical system is operated, may do harm to human body (e.g., infrared light may have bad influence on human body parts, such as the eyes, which are allergic to infrared light), the intensity of light source is then limited, thereby unable to broaden the fields of application. In order to overcome the limitation, infrared light having longer wavelength may be adopted, such that the optical system may work with a light source illuminating infrared light with higher intensity. However, due to the fact that conventional miniaturized optical systems are operated in vastly different wavelength ranges and designed to capture images of different properties, the conventional miniaturized optical systems are inapplicable within said infrared light having a longer wavelength. Accordingly, the present disclosure provides an optical system featuring different optical characteristics to satisfy various requirements.

SUMMARY

According to one aspect of the present disclosure, a photographing optical lens assembly includes five lens elements. The five lens elements are, in order from an object side to an image side, a first lens element, a second lens element, a third lens element, a fourth lens element and a fifth lens element. The first lens element has an object-side surface being convex in a paraxial region thereof. The third lens element has an object-side surface being convex in a paraxial region thereof. The fifth lens element has an image-side surface being concave in a paraxial region thereof, and the image-side surface of the fifth lens element has at least one convex shape in an off-axis region thereof. When an Abbe number of the third lens element at a wavelength of helium d-line is Vd3, an Abbe number of the fourth lens element at the wavelength of helium d-line is Vd4, an Abbe number of the fifth lens element at the wavelength of helium d-line is Vd5, an axial distance between the object-side surface of the first lens element and the image-side surface of the fifth lens element is TD, and an axial distance between the image-side surface of the fifth lens element and an image surface is BL, the following conditions are satisfied:

$15 < Vd3 + Vd4 + Vd5 < 75$; and $3.50 < TD/BL < 20$.

According to another aspect of the present disclosure, a photographing optical lens assembly includes four lens elements. The four lens elements are, in order from an object side to an image side, a first lens element, a second lens element, a third lens element and a fourth lens element. The second lens element has an object-side surface being convex in a paraxial region thereof. There is an air gap in a paraxial region between each of all adjacent lens elements of the photographing optical lens assembly. When a maximum value among Abbe numbers of all lens elements of the photographing optical lens assembly at a wavelength of helium d-line is Vdmax, a focal length of the photographing optical lens assembly at the wavelength of helium d-line is fd, a focal length of the second lens element at the wavelength of helium d-line is fd2, a focal length of the third lens element at the wavelength of helium d-line is fd3, and a curvature radius of an object-side surface of the first lens element is R1, the following conditions are satisfied:

$5 < Vd\,max < 32$;

$|fd2/fd3| < 6.0$; and $1.0 < fd/R1$.

According to still another aspect of the present disclosure, an electronic device includes the aforementioned photographing optical lens assembly, a light source and an image sensor, wherein the light source is configured to generate light within a wavelength range of 1200 nm to 1800 nm, and the image sensor is disposed on the image surface of the photographing optical lens assembly.

According to yet another aspect of the present disclosure, an electronic device includes a photographing optical lens assembly, a light source and an image sensor. The light source is configured to generate light within a wavelength range of 1200 nm to 1800 nm. The image sensor is disposed on an image surface of the photographing optical lens assembly. There are at least three and no more than eight lens elements in the photographing optical lens assembly. The photographing optical lens assembly is operated within the wavelength range of 1200 nm to 1800 nm, and the photographing optical lens assembly includes a first lens element closest to an imaged object. When an axial distance between an object-side surface of the first lens element and the image surface is TL, a maximum image height of the photographing optical lens assembly is ImgH, and half of a maximum field of view of the photographing optical lens assembly is HFOV, the following conditions are satisfied:

$0.5 < TL/ImgH < 4.0$;

$1.0\,[mm] < TL < 7.0\,[mm]$; and $0.10 < \tan(HFOV) < 1.0$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
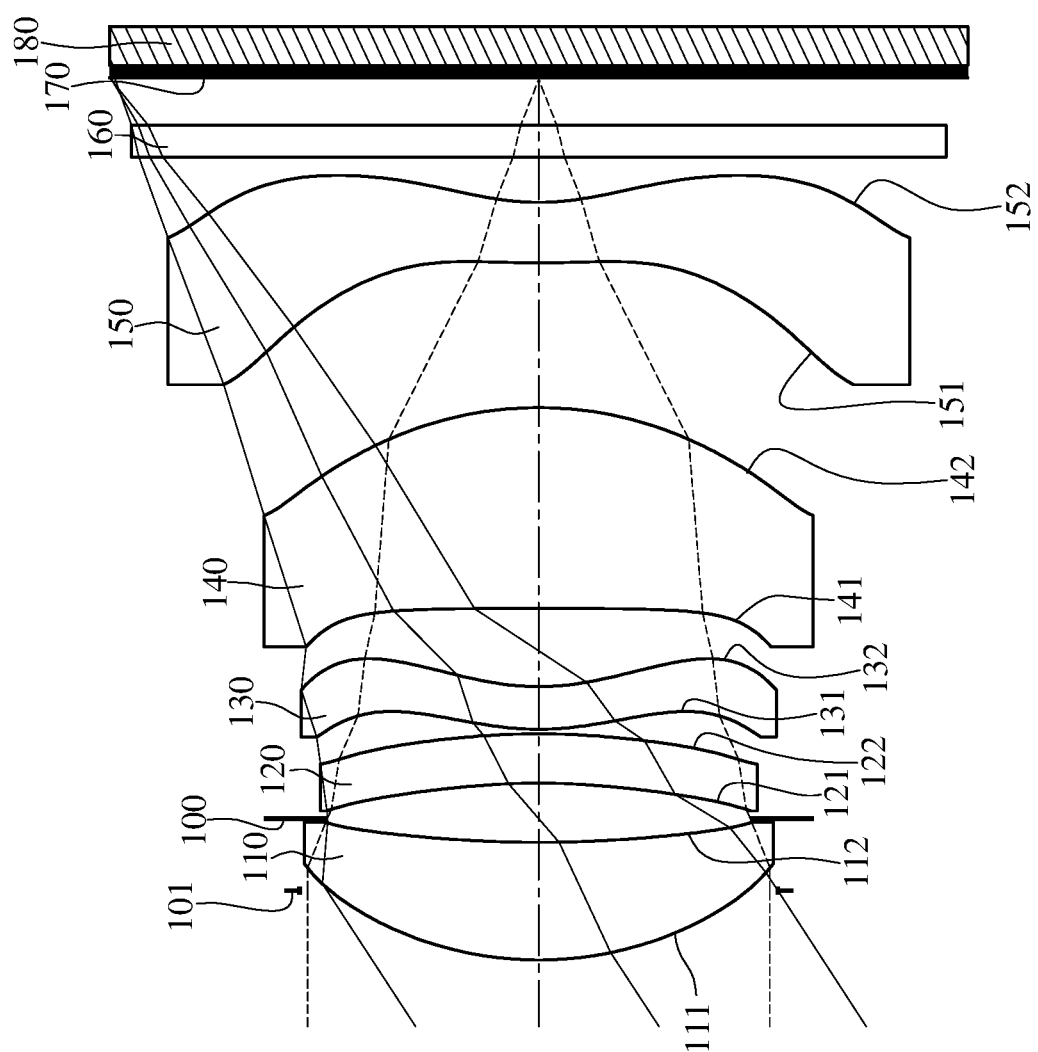
FIG. 1 is a schematic view of an image capturing unit according to the 1st embodiment of the present disclosure.

A photographing optical lens assembly includes at least three and no more than eight lens elements. Preferably, the photographing optical lens assembly can include four to seven lens elements. For example, when there are five lens elements in the photographing optical lens assembly, the five lens elements are, in order from an object side to an image side, a first lens element, a second lens element, a third lens element, a fourth lens element and a fifth lens element.

In the following description, a lens element closest to an image surface of the photographing optical lens assembly is referred to as an image-side lens element. For example, when there are five lens elements in the photographing optical lens assembly, and the five lens elements are, in order from an object side to an image side, a first lens element, a second lens element, a third lens element, a fourth lens element and a fifth lens element, the fifth lens element is referred to as the image-side lens element.

There can be an air gap in a paraxial region between each of all adjacent lens elements of the photographing optical lens assembly; that is, each of the lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. In addition, during the cementing process, those two lens elements might not be highly cemented due to misalignment and it is thereby not favorable for image quality. Therefore, having an air gap in a paraxial region between each of all adjacent lens elements of the photographing optical lens assembly in the present disclosure is favorable for avoiding the problems associated with the cemented lens elements while improving the yield rate.

The first lens element can have an object-side surface being convex in a paraxial region thereof; therefore, it is favorable for increasing the light-gathering ability of the photographing optical lens assembly. The object-side surface of the first lens element can have at least one inflection point in an off-axis region thereof; therefore, it is favorable for improving peripheral image quality. Please refer to FIG. 22, which shows a schematic view of an inflection point P on the object-side surface 211 of the first lens element 210 according to the 2nd embodiment of the present disclosure.

The second lens element can have an object-side surface being convex in a paraxial region thereof; therefore, it is favorable for the second lens element to have sufficient light converging capability so as to reduce the total track length of the photographing optical lens assembly. The second lens element can have an image-side surface being convex in a paraxial region thereof; therefore, the image-side surface of the second lens element is configured with respect to the object-side surface of the second lens element to correct aberrations. The second lens element can have positive refractive power; therefore, it is favorable for increasing light converging capability on the object side of the photographing optical lens assembly so as to reduce the total track length and thereby achieve compactness.

The third lens element can have an object-side surface being convex in a paraxial region thereof and an image-side surface being concave in a paraxial region thereof; therefore, it is favorable for correcting aberrations generated by the second lens element so as to improve image quality. The image-side surface of the third lens element can have at least one convex shape in an off-axis region thereof; therefore, it is favorable for reducing off-axis astigmatism and field curvature.

The fourth lens element can have positive refractive power; therefore, it is favorable for increasing the light converging capability and reducing the total track length of the photographing optical lens assembly so as to meet the requirement of compactness. The fourth lens element can have an image-side surface being concave in a paraxial region thereof, and the image-side surface of the fourth lens element can have at least one convex shape in an off-axis region thereof; therefore, it is favorable for reducing aberrations and correcting off-axis field curvature.

The fifth lens element can have an image-side surface being concave in a paraxial region thereof; therefore, it is favorable for moving a principal point toward the object side and achieving a compact arrangement of the photographing optical lens assembly. The image-side surface of the fifth lens element can have at least one convex shape in an off-axis region thereof; therefore, it is favorable for further correcting off-axis aberrations. The fifth lens element can have negative refractive power; therefore, adjusting the Petzval sum is favorable for correcting astigmatism and field curvature.

Figure 22:
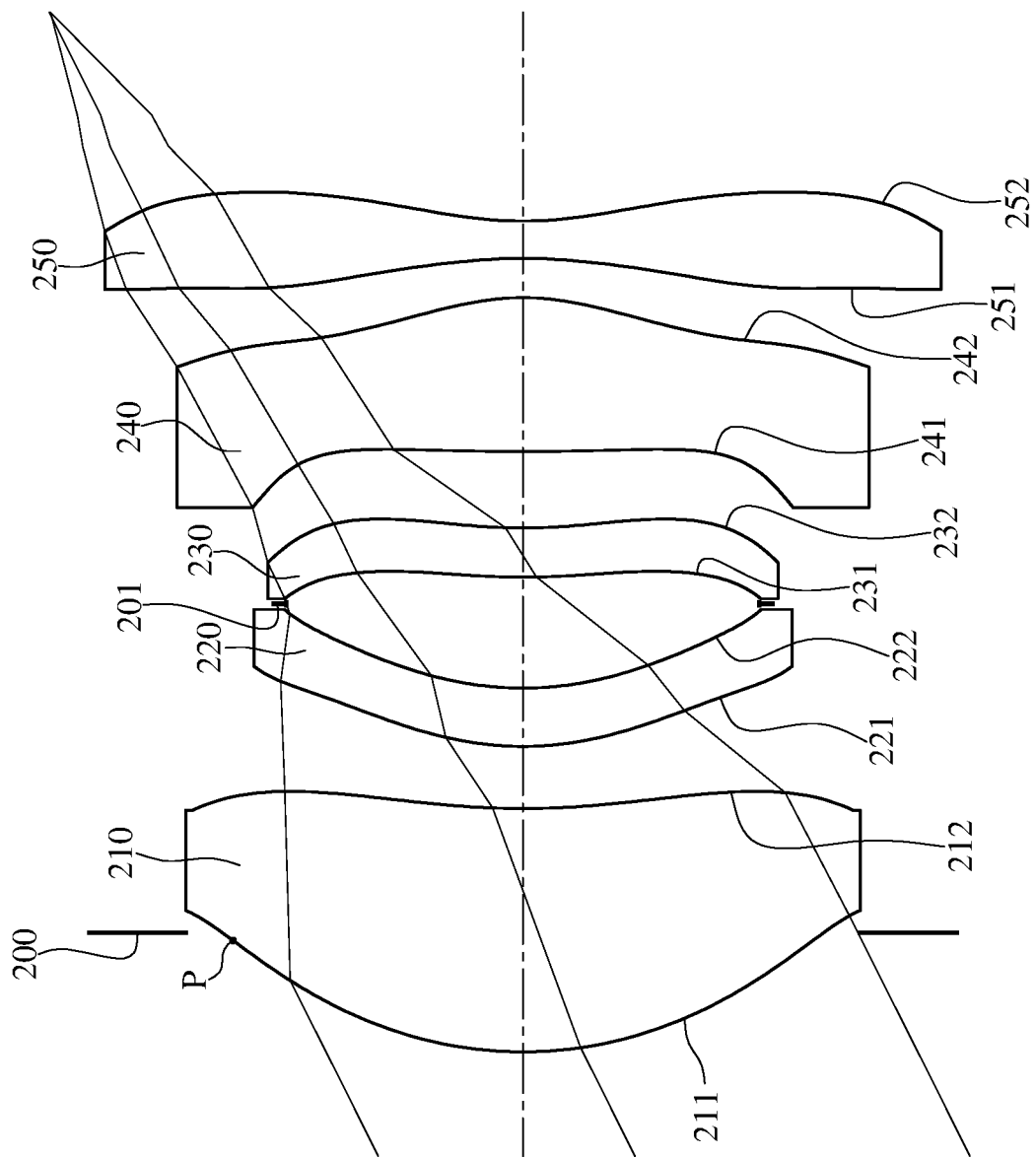
FIG. 22 shows a schematic view of an inflection point on the object-side surface of the first lens element according to the 2nd embodiment of the present disclosure.

According to the present disclosure, at least one lens surface among object-side surfaces and image-side surfaces of the first lens element, the second lens element, the third lens element, the fourth lens element and the fifth lens element can have at least one inflection point in an off-axis region thereof. Therefore, it is favorable for correcting off-axis aberrations to improve image quality. Please refer to FIG. 22, which shows a schematic view of an inflection point P on the object-side surface 211 of the first lens element 210 according to the 2nd embodiment of the present disclosure. The inflection point P on the object-side surface 211 of the first lens element 210 in FIG. 22 is only exemplary. The other lens surfaces of the five lens elements may also have an inflection point.

When an Abbe number of the third lens element at a wavelength of helium d-line is Vd3, an Abbe number of the fourth lens element at the wavelength of helium d-line is Vd4, and an Abbe number of the fifth lens element at the wavelength of helium d-line is Vd5, the following condition can be satisfied: $15<Vd3+Vd4+Vd5<75$. Therefore, it is favorable for obtaining a balance between correcting chromatic aberration and correcting astigmatism; furthermore, it is favorable for reducing the effective radius of each lens element so as to reduce the outer diameter of the photographing optical lens assembly, thereby achieving compactness. In some embodiments, said wavelength of helium d-line refers to the yellow Fraunhofer d (or D3) helium line at 587.6 nm wavelength. In addition, said Abbe number of one lens element at the wavelength of helium d-line is defined with the refractive index of material at the wavelength of helium d-line.

When an axial distance between the object-side surface of the first lens element and an image-side surface of the image-side lens element is TD, an axial distance between the image-side surface of the image-side lens element and the image surface is BL, the following condition can be satisfied: $3.50<TD/BL<20$. Therefore, it is favorable for ensuring a sufficient space between the image-side lens element and the image surface while limited space in the photographing optical lens assembly is efficiently utilized. Preferably, the following condition can also be satisfied: $5.0<TD/BL<10.0$. It is noted that said image-side lens element is referred to as different lens elements depending on the number of lens elements in the photographing optical lens assembly. For example, when there are five lens elements in the photographing optical lens assembly, the image-side lens element is referred to as the fifth lens element, TD is an axial distance between the object-side surface of the first lens element and the image-side surface of the fifth lens element, and BL is an axial distance between the image-side surface of the fifth lens element and the image surface.

When a maximum value among Abbe numbers of all lens elements of the photographing optical lens assembly at the wavelength of helium d-line is Vdmax, the following condition can be satisfied: $5<Vdmax<32$. Therefore, it is favorable for obtaining a balance between correcting chromatic aberration and correcting astigmatism; furthermore, it is favorable for reducing the effective radius of each lens element so as to reduce the outer diameter of the photographing optical lens assembly, thereby achieving compactness. Preferably, the following condition can also be satisfied: $7<Vdmax<25$.

When a focal length of the second lens element at the wavelength of helium d-line is fd2, and a focal length of the third lens element at the wavelength of helium d-line is fd3, the following condition can be satisfied: $|fd2/fd3|<6.0$. Therefore, it is favorable for ensuring the lens elements in the middle part of the photographing optical lens assembly to have sufficient refractive power and accompanied by the lens elements on the object side having stronger positive refractive power (e.g., the first lens element having positive refractive power) to enhance the aberration correction capability. Preferably, the following condition can also be satisfied: $|fd2/fd3|<2.0$. Said focal length of one lens element at the wavelength of helium d-line is referred to as the focal length of the lens element measured at the helium d-line as a reference wavelength.

When a focal length of the photographing optical lens assembly at the wavelength of helium d-line is fd, and a curvature radius of the object-side surface of the first lens element is R1, the following condition can be satisfied: $1.0<fd/R1$. Therefore, it is favorable for ensuring the first lens element to have sufficient refractive power so as to further reduce the total track length. Preferably, the following condition can also be satisfied: $2.0<fd/R1<5.0$. Said focal length of the photographing optical lens assembly at the wavelength of helium d-line is referred to as the focal length of the photographing optical lens assembly measured at the helium d-line as a reference wavelength.

According to the present disclosure, the photographing optical lens assembly can be operated within light having a wavelength range of 1200 nanometers (nm) to 1800 nm (i.e., infrared light). Therefore, it is favorable for imaging by the photographing optical lens assembly with an infrared light source illuminating infrared light with higher intensity.

When an axial distance between the object-side surface of the first lens element and the image surface is TL, and a maximum image height of the photographing optical lens assembly (half of a diagonal length of an effective photosensitive area of an image sensor) is ImgH, the following condition can be satisfied: $0.5<TL/ImgH<4.0$. Therefore, it is favorable for keeping the photographing optical lens assembly in compact size so as to be applicable to various portable electronic devices.

When the axial distance between the object-side surface of the first lens element and the image surface is TL, the following condition can be satisfied: $1.0\ [mm]<TL<7.0\ [mm]$. Therefore, it is favorable for the miniaturization of the photographing optical lens assembly.

When half of a maximum field of view of the photographing optical lens assembly is HFOV, the following condition can be satisfied: $0.10<\tan(HFOV)<1.0$. Therefore, it is favorable for increasing the identification and detection accuracy of the photographing optical lens assembly while providing sufficient field of view. Preferably, the following condition can be satisfied: $0.10<\tan(HFOV)<0.70$. More preferably, the following condition can also be satisfied: $0.10<\tan(HFOV)<0.50$.

When the focal length of the photographing optical lens assembly at the wavelength of helium d-line is fd, and an entrance pupil diameter of the photographing optical lens assembly is EPD, the following condition can be satisfied: $0.5 < \text{fd}/\text{EPD} < 1.60$. Therefore, it is favorable for increasing the aperture size so as to lower the required light intensity from a light source, such that the photographing optical lens assembly is more applicable to portable electronic devices, especially applicable to functions such as distance measurements. Preferably, the following condition can also be satisfied: $1.0 < \text{fd}/\text{EPD} < 1.50$.

When an Abbe number of the first lens element at the wavelength of helium d-line is Vd1, the following condition can be satisfied: $40 < \text{Vd1} < 80$. Therefore, it is favorable for obtaining a balance between correcting chromatic aberration and correcting astigmatism.

When the axial distance between the image-side surface of the image-side lens element and the image surface is BL, and a sum of axial distances between each of all adjacent lens elements of the photographing optical lens assembly is $\Sigma$AT, the following condition can be satisfied: $\text{BL}/\Sigma\text{AT} < 1.50$. Therefore, it is favorable for better image quality by providing a sufficient axial distance between each of all adjacent lens elements of the photographing optical lens assembly.

When the focal length of the second lens element at the wavelength of helium d-line is fd2, and the focal length of the third lens element at the wavelength of helium d-line is fd3, the following condition can be satisfied: $|\text{fd3}/\text{fd2}| < 1.0$. Therefore, it is favorable for the lens elements in the middle part of the photographing optical lens assembly having sufficient refractive power so as to enhance the aberration correction capability while configuring with the lens elements having stronger positive refractive power.

When the entrance pupil diameter of the photographing optical lens assembly is EPD, and the maximum image height of the photographing optical lens assembly is ImgH, the following condition can be satisfied: $1.0 < \text{EPD}/\text{ImgH}$. Therefore, it is favorable for increasing the aperture size so as to lower the required light intensity from the light source, such that the photographing optical lens assembly is more applicable to portable electronic devices, especially applicable to functions such as distance measurements.

When the Abbe number of the first lens element at the wavelength of helium d-line is Vd1, an Abbe number of the second lens element at the wavelength of helium d-line is Vd2, the Abbe number of the third lens element at the wavelength of helium d-line is Vd3, and the Abbe number of the fourth lens element at the wavelength of helium d-line is Vd4, the following condition can be satisfied: $20 < \text{Vd1} + \text{Vd2} + \text{Vd3} + \text{Vd4} < 100$. Therefore, it is favorable for obtaining a balance between correcting chromatic aberration and correcting astigmatism; furthermore, it is favorable for reducing the effective radius of each lens element so as to achieve compactness.

When a focal length of the first lens element at the wavelength of helium d-line is fd1, and the focal length of the second lens element at the wavelength of helium d-line is fd2, the following condition can be satisfied: $|\text{fd2}/\text{fd1}| < 1.0$. Therefore, it is favorable for the lens elements in the middle part of the photographing optical lens assembly having sufficient refractive power so as to enhance the aberration correction capability while configuring with the lens elements on the object side having stronger positive refractive power (e.g., the first lens element having positive refractive power).

When a curvature radius of the object-side surface of the second lens element is R3, and a curvature radius of the image-side surface of the second lens element is R4, the following condition can be satisfied: $|\text{R3}/\text{R4}| < 1.0$. Therefore, it is favorable for the second lens element having sufficient refractive power so as to enhance the aberration correction capability.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the photographing optical lens assembly can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the present disclosure, the photographing optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
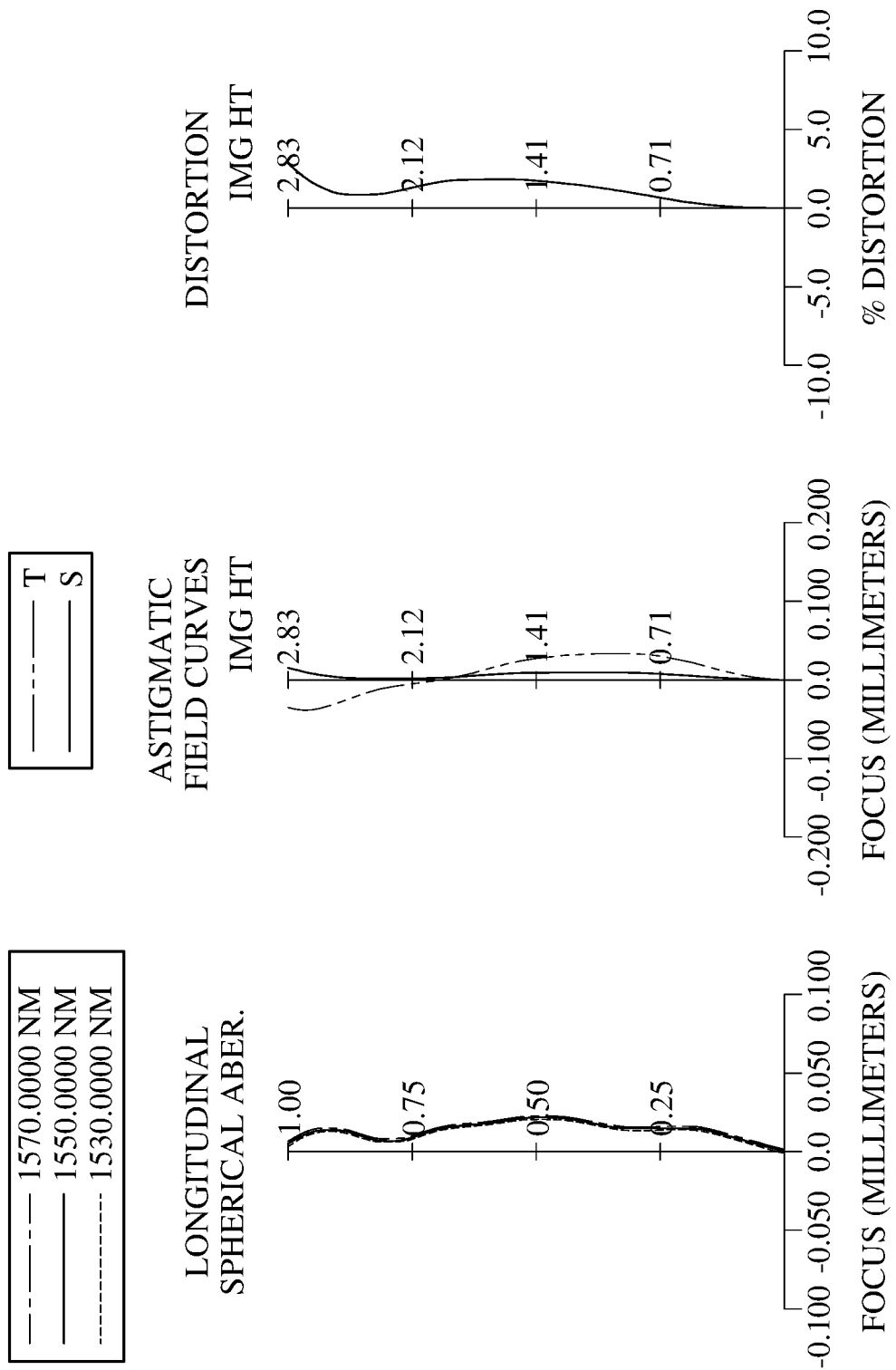
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 180. The photographing optical lens assembly includes, in order from an object side to an image side, a stop 101, a first lens element 110, an aperture stop 100, a second lens element 120, a third lens element 130, a fourth lens element 140, a fifth lens element 150, a filter 160 and an image surface 170. The photographing optical lens assembly includes five single and non-cemented lens elements (110, 120, 130, 140 and 150) with no additional lens element disposed between each of the adjacent five lens elements, wherein there is an air gap between each of all adjacent lens elements.

The first lens element 110 with positive refractive power has an object-side surface 111 being convex in a paraxial region thereof and an image-side surface 112 being concave in a paraxial region thereof. The first lens element 110 is made of glass material and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has at least one convex shape in an off-axis region thereof.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The image-side surface 142 of the fourth lens element 140 has at least one convex shape in an off-axis region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex shape in an off-axis region thereof.

The filter 160 is made of glass material and located between the fifth lens element 150 and the image surface 170, and will not affect the focal length of the photographing optical lens assembly. The image sensor 180 is disposed on or near the image surface 170 of the photographing optical lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens assembly of the image capturing unit according to the 1st embodiment, when a focal length of the photographing optical lens assembly at the wavelength of 1550 nm (i.e., infrared light) is f, a focal length of the photographing optical lens assembly at the wavelength of helium d-line is fd, an f-number of the photographing optical lens assembly at the wavelength of helium d-line is Fno, and half of a maximum field of view of the photographing optical lens assembly is HFOV, these parameters have the following values: f=4.21 millimeters (mm), fd=3.97 mm, Fno=1.38, HFOV=33.0 degrees (deg.).

When an entrance pupil diameter of the photographing optical lens assembly is EPD, and a maximum image height of the photographing optical lens assembly is ImgH, the following condition is satisfied: EPD/ImgH=1.02.

When half of the maximum field of view of the photographing optical lens assembly is HFOV, the following condition is satisfied: tan(HFOV)=0.65.

When a maximum value among Abbe numbers of all lens elements of the photographing optical lens assembly at the wavelength of helium d-line is Vdmax, the following condition is satisfied: Vdmax=61.16. In this embodiment, an Abbe number of the first lens element 110 at the wavelength of helium d-line is larger than Abbe numbers of the other lens elements. Therefore, Vdmax is equal to the Abbe number of the first lens element 110 at the wavelength of helium d-line.

When the Abbe number of the first lens element 110 at the wavelength of helium d-line is Vd1, the following condition is satisfied: Vd1=61.16.

When the Abbe number of the first lens element 110 at the wavelength of helium d-line is Vd1, an Abbe number of the second lens element 120 at the wavelength of helium d-line is Vd2, an Abbe number of the third lens element 130 at the wavelength of helium d-line is Vd3, and an Abbe number of the fourth lens element 140 at the wavelength of helium d-line is Vd4, the following condition is satisfied: Vd1+Vd2+Vd3+Vd4=156.81.

When the Abbe number of the third lens element 130 at the wavelength of helium d-line is Vd3, the Abbe number of the fourth lens element 140 at the wavelength of helium d-line is Vd4, and an Abbe number of the fifth lens element 150 at the wavelength of helium d-line is Vd5, the following condition is satisfied:

$$Vd3+Vd4+Vd5=58.32.$$

When an axial distance between the object-side surface 111 of the first lens element 110 and the image surface 170 is TL, the following condition is satisfied:

$$TL=5.84 \text{ [mm]}.$$

When the axial distance between the object-side surface 111 of the first lens element 110 and the image surface 170 is TL, and the maximum image height of the photographing optical lens assembly is ImgH, the following condition is satisfied: TL/ImgH=2.06.

When an axial distance between the object-side surface 111 of the first lens element 110 and the image-side surface 152 of the fifth lens element 150 is TD, and an axial distance between the image-side surface 152 of the fifth lens element 150 and the image surface 170 is BL, the following condition is satisfied: TD/BL=7.17.

When the axial distance between the image-side surface 152 of the fifth lens element 150 and the image surface 170 is BL, and a sum of axial distances between each of all adjacent lens elements of the photographing optical lens assembly is ΣAT, the following condition is satisfied: BL/ΣAT=0.37. In this embodiment, an axial distance between two adjacent lens elements is an air gap in a paraxial region between the two adjacent lens elements.

When a curvature radius of the object-side surface 121 of the second lens element 120 is R3, and a curvature radius of the image-side surface 122 of the second lens element 120 is R4, the following condition is satisfied: |R3/R4|=0.84.

When the focal length of the photographing optical lens assembly at the wavelength of helium d-line is fd, and a curvature radius of the object-side surface 111 of the first lens element 110 is R1, the following condition is satisfied: fd/R1=1.69.

When a focal length of the first lens element 110 at the wavelength of helium d-line is fd1, and a focal length of the second lens element 120 at the wavelength of helium d-line is fd2, the following condition is satisfied: |fd2/fd1|=11.27. The focal length of one lens element at the wavelength of helium d-line is referred to as the focal length of the lens element measured at the helium d-line as a reference wavelength.

When the focal length of the second lens element 120 at the wavelength of helium d-line is fd2, and a focal length of the third lens element 130 at the wavelength of helium d-line is fd3, the following condition is satisfied: |fd2/fd3|=1.74.

When the focal length of the second lens element 120 at the wavelength of helium d-line is fd2, and the focal length of the third lens element 130 at the wavelength of helium d-line is fd3, the following condition is satisfied: |fd3/fd2|=0.58.

The detailed optical data of the 1st embodiment are shown in Table 1 and the aspheric surface data are shown in Table 2 below.

TABLE 1

1st Embodiment f = 4.21 mm, Fno = 1.38, HFOV = 33.0 deg.    fd = 3.97 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | 10000.000 | | | | | | |
| 1 | Stop | Plano | | −0.458 | | | | | | |
| 2 | Lens 1 | 2.348 | (ASP) | 0.778 | Glass | 1.573 | 61.2 | 5.62 | 1.589 | 5.46 |
| 3 | | 7.643 | (ASP) | 0.156 | | | | | | |
| 4 | Ape. Stop | Plano | | 0.236 | | | | | | |
| 5 | Lens 2 | −4.171 | (ASP) | 0.326 | Plastic | 1.498 | 56.8 | −62.86 | 1.511 | −61.49 |
| 6 | | −4.937 | (ASP) | 0.030 | | | | | | |
| 7 | Lens 3 | 1.881 | (ASP) | 0.282 | Plastic | 1.627 | 19.4 | −36.55 | 1.669 | −35.39 |
| 8 | | 1.638 | (ASP) | 0.518 | | | | | | |
| 9 | Lens 4 | −69.169 | (ASP) | 1.328 | Plastic | 1.627 | 19.4 | 3.96 | 1.669 | 3.71 |
| 10 | | −2.412 | (ASP) | 0.957 | | | | | | |
| 11 | Lens 5 | 5.778 | (ASP) | 0.400 | Plastic | 1.627 | 19.4 | −3.63 | 1.669 | −3.41 |

TABLE 1-continued

1st Embodiment f = 4.21 mm, Fno = 1.38, HFOV = 33.0 deg.          fd = 3.97 mm

| Surface # | | Curvature Radius | Thickness | Material | Index | Abbe # | Focal Length | Index | Focal Length |
|---|---|---|---|---|---|---|---|---|---|
| 12 | | 1.590 (ASP) | 0.300 | | | | | | |
| 13 | Filter | Plano | 0.210 | Glass | 1.501 | 64.2 | — | 1.517 | — |
| 14 | | Plano | 0.315 | | | | | | |
| 15 | Image | Plano | — | | | | | | |

Reference wavelength to refractive index and focal length is 1550 nm.   Reference wavelength
Reference wavelength to Abbe number is 587.6 nm (d-line).                is 587.6 nm (d-line).
An effective radius of the stop 101 (Surface 1) is 1.580 mm.

TABLE 2

Aspheric Coefficients

| Surface # | 2 | 3 | 5 | 6 | 7 |
|---|---|---|---|---|---|
| k = | −2.1208E+01 | −5.0000E+01 | −6.0420E+00 | −9.0669E+00 | −1.0427E+00 |
| A4 = | 1.8811E−01 | −1.3744E−03 | 7.5483E−02 | 9.3875E−03 | −1.9197E−01 |
| A6 = | −2.3198E−01 | 4.3886E−02 | −1.1411E−01 | 7.1419E−03 | 8.3652E−02 |
| A8 = | 2.5167E−01 | −1.6070E−01 | 1.0282E−01 | −2.8638E−02 | −5.2045E−02 |
| A10 = | −1.8543E−01 | 3.0688E−01 | −5.4313E−02 | 2.6753E−02 | 1.3533E−02 |
| A12 = | 8.5644E−02 | −3.4183E−01 | 1.3816E−02 | −1.3935E−02 | −7.2165E−04 |
| A14 = | −2.2027E−02 | 2.3206E−01 | −1.2168E−03 | 2.9707E−03 | — |
| A16 = | 2.4205E−03 | −9.4201E−02 | — | — | — |
| A18 = | — | 2.0954E−02 | — | — | — |
| A20 = | — | −1.9513E−03 | — | — | — |

| Surface # | 8 | 9 | 10 | 11 | 12 |
|---|---|---|---|---|---|
| k = | −2.5767E+00 | −1.0000E+00 | −1.2453E+01 | −3.3209E+01 | −6.7918E+00 |
| A4 = | −1.1477E−01 | −1.0849E−02 | −1.0401E−01 | −2.0339E−01 | −9.4641E−02 |
| A6 = | 3.7198E−02 | 3.4905E−03 | 6.9914E−02 | 7.8335E−02 | 3.6485E−02 |
| A8 = | −1.7149E−02 | −1.3873E−02 | −4.0792E−02 | −1.2033E−02 | −8.6572E−03 |
| A10 = | 1.0403E−03 | 1.3342E−02 | 1.6226E−02 | −2.2658E−03 | 9.9082E−04 |
| A12 = | 3.0887E−04 | −7.9538E−03 | −3.8528E−03 | 1.0098E−03 | −5.0286E−05 |
| A14 = | — | 1.4853E−03 | 4.0694E−04 | −8.9626E−05 | 1.3320E−06 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
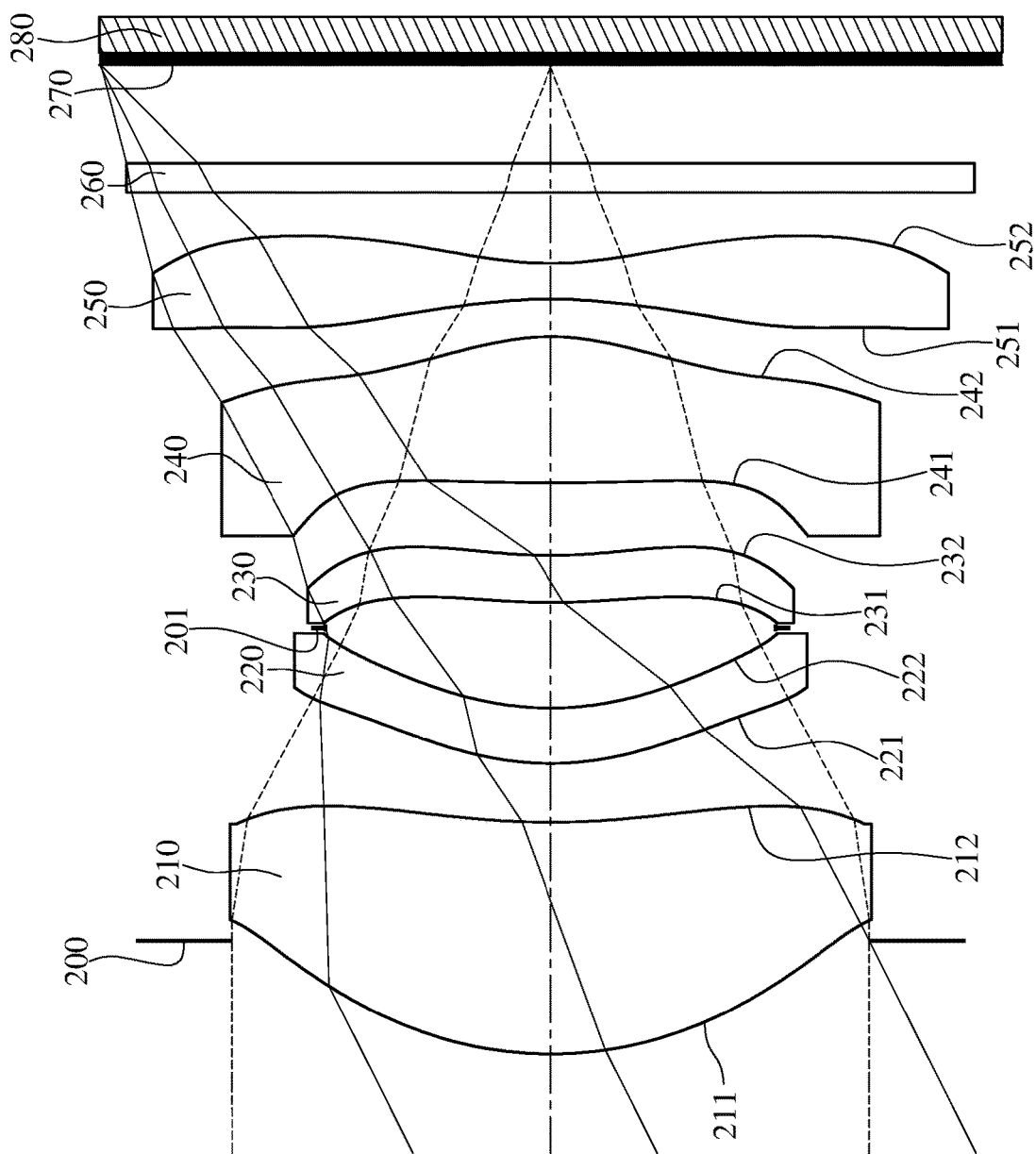
FIG. 3 is a schematic view of an image capturing unit according to the 2nd embodiment of the present disclosure.
Figure 4:
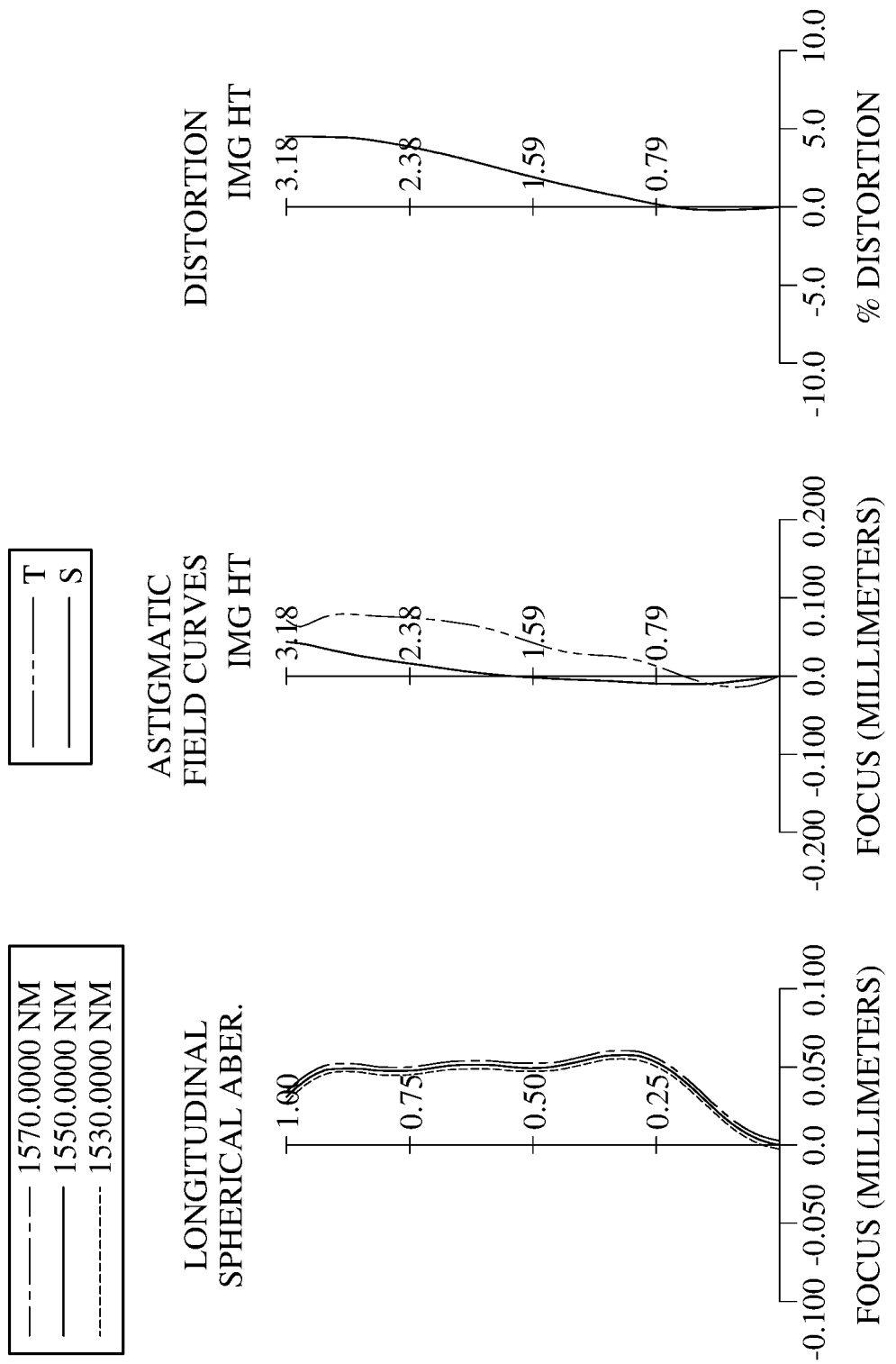
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 280. The photographing optical lens assembly includes, in order from an object side to an image side, an aperture stop 200, a first lens element 210, a second lens element 220, a stop 201, a third lens element 230, a fourth lens element 240, a fifth lens element 250, a filter 260 and an image surface 270. The photographing optical lens assembly includes five single and non-cemented lens elements (210, 220, 230, 240 and 250) with no additional lens element disposed between each of the adjacent five lens elements, wherein there is an air gap between each of all adjacent lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one inflection point in an off-axis region thereof.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has at least one convex shape in an off-axis region thereof.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The image-side surface 242 of the fourth lens element 240 has at least one convex shape in an off-axis region thereof.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex shape in an off-axis region thereof.

The filter 260 is made of glass material and located between the fifth lens element 250 and the image surface 270, and will not affect the focal length of the photographing optical lens assembly. The image sensor 280 is disposed on or near the image surface 270 of the photographing optical lens assembly.

The detailed optical data of the 2nd embodiment are shown in Table 3 and the aspheric surface data are shown in Table 4 below.

TABLE 3

2nd Embodiment f = 6.01 mm, Fno = 1.34, HFOV = 26.6 deg.    fd = 5.73 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | 10000.000 | | | | | | |
| 1 | Ape. Stop | Plano | | −0.800 | | | | | | |
| 2 | Lens 1 | 2.647 | (ASP) | 1.634 | Plastic | 1.531 | 56.0 | 8.33 | 1.544 | 8.10 |
| 3 | | 5.188 | (ASP) | 0.416 | | | | | | |
| 4 | Lens 2 | 2.104 | (ASP) | 0.392 | Plastic | 1.627 | 19.4 | 28.71 | 1.669 | 26.28 |
| 5 | | 2.212 | (ASP) | 0.567 | | | | | | |
| 6 | Stop | Plano | | 0.178 | | | | | | |
| 7 | Lens 3 | 4.724 | (ASP) | 0.330 | Plastic | 1.498 | 56.8 | −31.52 | 1.511 | −30.80 |
| 8 | | 3.548 | (ASP) | 0.513 | | | | | | |
| 9 | Lens 4 | 15.937 | (ASP) | 1.033 | Plastic | 1.498 | 56.8 | 2.99 | 1.511 | 2.92 |
| 10 | | −1.609 | (ASP) | 0.264 | | | | | | |
| 11 | Lens 5 | −3.173 | (ASP) | 0.250 | Plastic | 1.521 | 55.9 | −2.62 | 1.534 | −2.56 |
| 12 | | 2.465 | (ASP) | 0.500 | | | | | | |
| 13 | Filter | Plano | | 0.210 | Glass | 1.501 | 64.2 | — | 1.517 | — |
| 14 | | Plano | | 0.693 | | | | | | |
| 15 | Image | Plano | | — | | | | | | |

Reference wavelength to refractive index and focal length is 1550 nm.
Reference wavelength to Abbe number is 587.6 nm (d-line).
An effective radius of the stop 201 (Surface 6) is 1.585 mm.
Reference wavelength is 587.6 nm (d-line).

TABLE 4

Aspheric Coefficients

| Surface # | 2 | 3 | 4 | 5 | 7 |
|---|---|---|---|---|---|
| k = | −4.4002E+00 | 2.7710E+00 | −1.7813E+00 | −9.3511E+00 | −3.9580E+01 |
| A4 = | 2.3591E−02 | −2.8244E−02 | −1.9213E−02 | 8.4176E−02 | −4.1305E−02 |
| A6 = | −1.0747E−03 | 5.0777E−03 | 8.5563E−03 | −7.8887E−02 | −7.2821E−03 |
| A8 = | −1.6217E−03 | −2.6083E−03 | −9.3615E−03 | 7.2520E−02 | 9.4984E−03 |
| A10 = | 8.7815E−04 | 7.4857E−04 | 3.3539E−03 | −5.4731E−02 | −5.6667E−03 |
| A12 = | −2.2530E−04 | −1.4095E−04 | −5.9355E−04 | 2.6190E−02 | 2.4907E−03 |
| A14 = | 2.8153E−05 | 1.6233E−05 | 1.0713E−04 | −6.8062E−03 | −8.8716E−04 |
| A16 = | −1.5066E−06 | −8.9840E−07 | −9.7015E−06 | 7.5287E−04 | 1.2735E−04 |

| Surface # | 8 | 9 | 10 | 11 | 12 |
|---|---|---|---|---|---|
| k = | −4.1631E+01 | −1.9770E+01 | −6.4632E+00 | −5.6574E+01 | −5.2580E−01 |
| A4 = | 4.9313E−03 | −2.2273E−02 | 3.9723E−02 | −2.0009E−02 | −1.0707E−01 |
| A6 = | −7.9440E−02 | 2.4805E−02 | −2.2146E−02 | 3.0556E−03 | 3.9509E−02 |
| A8 = | 7.3015E−02 | −3.3654E−02 | 1.6808E−02 | 3.9856E−03 | −1.1843E−02 |
| A10 = | −4.4961E−02 | 1.9911E−02 | −6.9767E−03 | −1.5590E−03 | 2.3539E−03 |
| A12 = | 1.7378E−02 | −7.0860E−03 | 1.4117E−03 | 2.3065E−04 | −2.8372E−04 |
| A14 = | −3.8474E−03 | 1.2344E−03 | −1.3788E−04 | −1.5488E−05 | 1.8152E−05 |
| A16 = | 3.6685E−04 | −7.3995E−05 | 5.2646E−06 | 3.9506E−07 | −4.6450E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.01 | TL [mm] | 6.98 |
| fd/EPD | 1.34 | TL/ImgH | 2.20 |
| HFOV [deg.] | 26.6 | TD/BL | 4.54 |
| Number of lens elements | 5 | BL/ΣAT | 0.63 |
| EPD/ImgH | 1.35 | |R3/R4| | 0.95 |
| tan(HFOV) | 0.50 | fd/R1 | 2.16 |
| Vdmax | 56.76 | |fd2/fd1| | 3.24 |
| Vd1 | 55.98 | |fd2/fd3| | 0.85 |
| Vd1 + Vd2 + Vd3 + Vd4 | 188.95 | |fd3/fd2| | 1.17 |
| Vd3 + Vd4 + Vd5 | 169.45 | — | — |

3rd Embodiment

Figure 5:
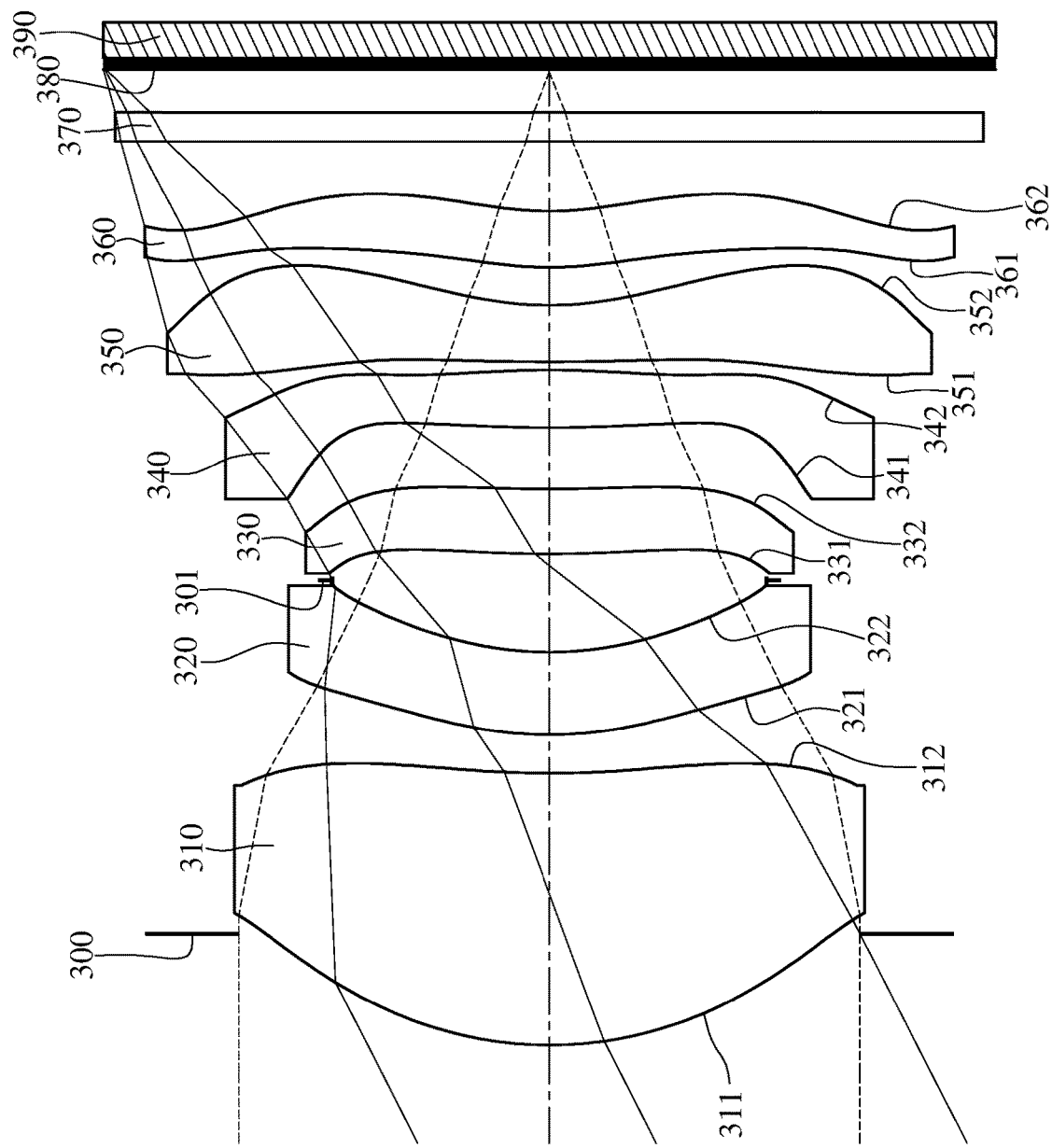
FIG. 5 is a schematic view of an image capturing unit according to the 3rd embodiment of the present disclosure.
Figure 6:
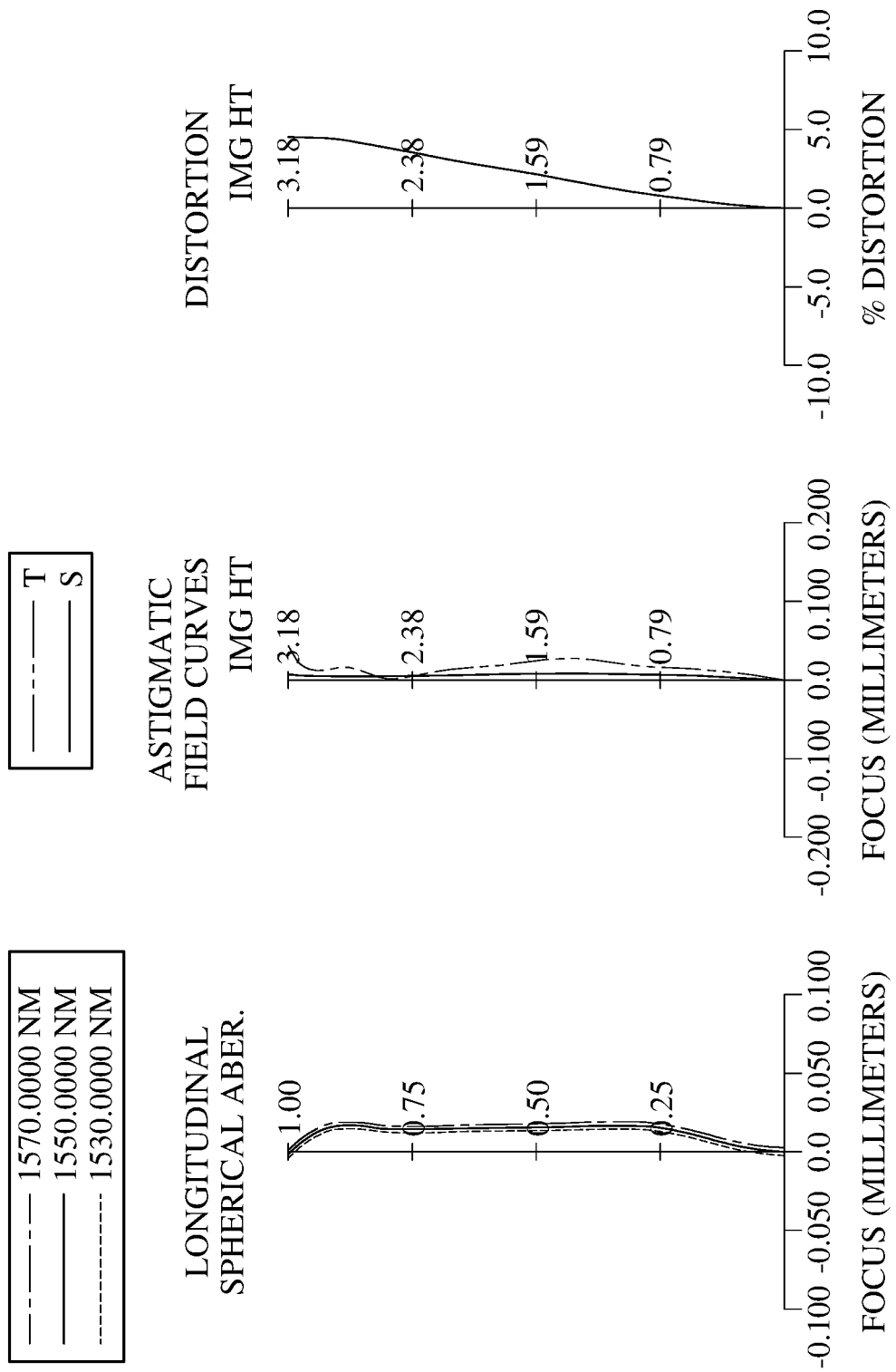
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, an aperture stop 300, a first lens element 310, a second lens element 320, a stop 301, a third lens element 330, a fourth lens element 340, a fifth lens element 350, a sixth lens element 360, a filter 370 and an image surface 380. The photographing optical lens assembly includes six single and non-cemented lens elements (310, 320, 330, 340, 350 and 360) with no additional lens element disposed between each of the adjacent six lens elements, wherein there is an air gap between each of all adjacent lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has at least one inflection point in an off-axis region thereof.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has at least one convex shape in an off-axis region thereof.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has at least one convex shape in an off-axis region thereof.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex shape in an off-axis region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric.

The filter 370 is made of glass material and located between the sixth lens element 360 and the image surface 380, and will not affect the focal length of the photographing optical lens assembly. The image sensor 390 is disposed on or near the image surface 380 of the photographing optical lens assembly.

In this embodiment, the axial distance between the object-side surface 311 of the first lens element 310 and the image-side surface 362 of the sixth lens element 360 is TD, and the axial distance between the image-side surface 362 of the sixth lens element 360 and the image surface 380 is BL.

The detailed optical data of the 3rd embodiment are shown in Table 5 and the aspheric surface data are shown in Table 6 below.

TABLE 5

3rd Embodiment f = 5.94 mm, Fno = 1.34, HFOV = 27.0 deg.   fd = 5.69 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | 10000.000 | | | | | | |
| 1 | Ape. Stop | Plano | | −0.800 | | | | | | |
| 2 | Lens 1 | 2.702 | (ASP) | 1.947 | Plastic | 1.531 | 56.0 | 7.35 | 1.544 | 7.15 |
| 3 | | 6.594 | (ASP) | 0.275 | | | | | | |
| 4 | Lens 2 | 2.728 | (ASP) | 0.592 | Plastic | 1.620 | 20.4 | 238.51 | 1.660 | 188.50 |
| 5 | | 2.548 | (ASP) | 0.514 | | | | | | |

TABLE 5-continued

3rd Embodiment f = 5.94 mm, Fno = 1.34, HFOV = 27.0 deg.     fd = 5.69 mm

| Surface # | | Curvature Radius | | Thickness | Material | Index | Abbe # | Focal Length | Index | Focal Length |
|---|---|---|---|---|---|---|---|---|---|---|
| 6 | Stop | Plano | | 0.187 | | | | | | |
| 7 | Lens 3 | 8.247 | (ASP) | 0.464 | Plastic | 1.531 | 56.0 | 80.01 | 1.544 | 77.94 |
| 8 | | 10.036 | (ASP) | 0.443 | | | | | | |
| 9 | Lens 4 | 8.954 | (ASP) | 0.411 | Plastic | 1.531 | 56.0 | 7.41 | 1.544 | 7.23 |
| 10 | | −6.907 | (ASP) | 0.058 | | | | | | |
| 11 | Lens 5 | 21.441 | (ASP) | 0.403 | Plastic | 1.498 | 56.8 | −5.45 | 1.511 | −5.32 |
| 12 | | 2.396 | (ASP) | 0.273 | | | | | | |
| 13 | Lens 6 | 2.516 | (ASP) | 0.400 | Plastic | 1.531 | 56.0 | −74.41 | 1.544 | −73.76 |
| 14 | | 2.235 | (ASP) | 0.500 | | | | | | |
| 15 | Filter | Plano | | 0.210 | Glass | 1.501 | 64.2 | — | 1.517 | — |
| 16 | | Plano | | 0.304 | | | | | | |
| 17 | Image | Plano | | — | | | | | | |

Reference wavelength to refractive index and focal length is 1550 nm.
Reference wavelength to Abbe number is 587.6 nm (d-line).
An effective radius of the stop 301 (Surface 6) is 1.550 mm.

Reference wavelength is 587.6 nm (d-line).

TABLE 6

Aspheric Coefficients

| Surface # | 2 | 3 | 4 | 5 | 7 | 8 |
|---|---|---|---|---|---|---|
| k = | −4.4243E+00 | 4.6984E+00 | −1.7305E+00 | −9.2230E+00 | 4.7889E+00 | −4.2497E+01 |
| A4 = | 2.4938E−02 | −2.5223E−02 | −1.6190E−02 | 6.5036E−02 | −2.6556E−02 | −3.3342E−02 |
| A6 = | −3.9585E−03 | 2.9089E−03 | −2.1271E−03 | −5.6776E−02 | −1.3605E−02 | −1.5620E−02 |
| A8 = | 5.5701E−04 | −1.4257E−03 | 1.8608E−03 | 5.9417E−02 | 2.4785E−02 | 2.8974E−02 |
| A10 = | −1.0552E−05 | 3.2770E−04 | −1.9667E−03 | −5.1071E−02 | −2.8162E−02 | −2.9225E−02 |
| A12 = | −2.2308E−05 | −3.0176E−05 | 1.0048E−03 | 2.7713E−02 | 1.6707E−02 | 1.5147E−02 |
| A14 = | 4.0809E−06 | −2.8309E−07 | −2.0032E−04 | −8.1227E−03 | −5.3938E−03 | −4.1001E−03 |
| A16 = | −3.2654E−07 | 1.1134E−07 | 1.5417E−05 | 1.0019E−03 | 6.9775E−04 | 4.5388E−04 |

| Surface # | 9 | 10 | 11 | 12 | 13 | 14 |
|---|---|---|---|---|---|---|
| k = | −2.0552E+01 | −1.5530E+01 | −7.3319E+00 | −4.7687E−01 | −1.7435E+01 | −1.0892E+01 |
| A4 = | −4.4687E−02 | 6.4169E−03 | 1.3421E−02 | −5.3808E−02 | −5.3745E−02 | −6.7010E−02 |
| A6 = | 5.7202E−02 | 6.0953E−02 | −3.0623E−02 | 5.5983E−04 | 2.1805E−02 | 2.3543E−02 |
| A8 = | −4.4798E−02 | −4.8753E−02 | 1.3134E−02 | 3.3110E−03 | −4.3855E−03 | −7.3939E−03 |
| A10 = | 1.5418E−02 | 1.5632E−02 | −2.6451E−03 | −1.3074E−03 | 3.7292E−04 | 1.6310E−03 |
| A12 = | −3.6875E−03 | −2.6207E−03 | 2.8134E−04 | 2.3120E−04 | −5.5030E−06 | −2.1269E−04 |
| A14 = | 4.8399E−04 | 2.3414E−04 | −1.4995E−05 | −2.0897E−05 | −4.9583E−07 | 1.4948E−05 |
| A16 = | −1.3086E−05 | −9.0264E−06 | 3.0803E−07 | 7.8668E−07 | — | −4.3748E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.94 | TL [mm] | 6.98 |
| fd/EPD | 1.34 | TL/ImgH | 2.20 |
| HFOV [deg.] | 27.0 | TD/BL | 6.86 |
| Number of lens elements | 6 | BL/ΣAT | 0.50 |
| EPD/ImgH | 1.34 | |R3/R4| | 1.07 |
| tan(HFOV) | 0.51 | fd/R1 | 2.11 |
| Vdmax | 56.76 | |fd2/fd1| | 26.35 |
| Vd1 | 55.98 | |fd2/fd3| | 2.42 |

-continued

| 3rd Embodiment | | | |
|---|---|---|---|
| Vd1 + Vd2 + Vd3 + Vd4 | 188.35 | |fd3/fd2| | 0.41 |
| Vd3 + Vd4 + Vd5 | 168.73 | — | — |

4th Embodiment

Figure 7:
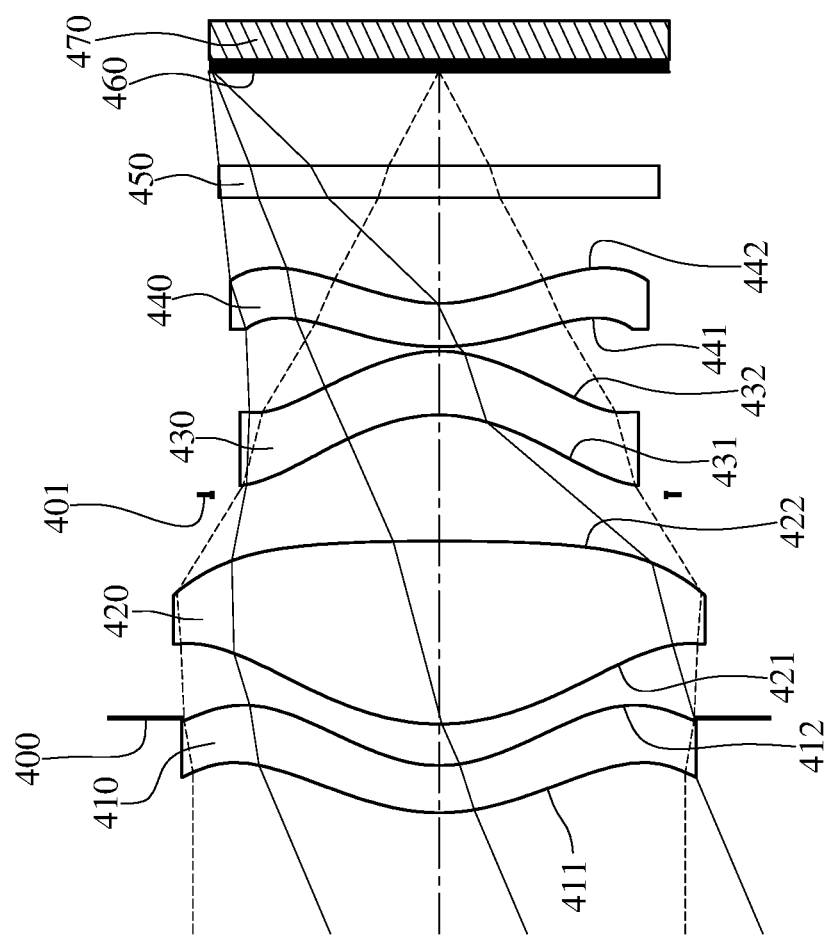
FIG. 7 is a schematic view of an image capturing unit according to the 4th embodiment of the present disclosure.
Figure 8:
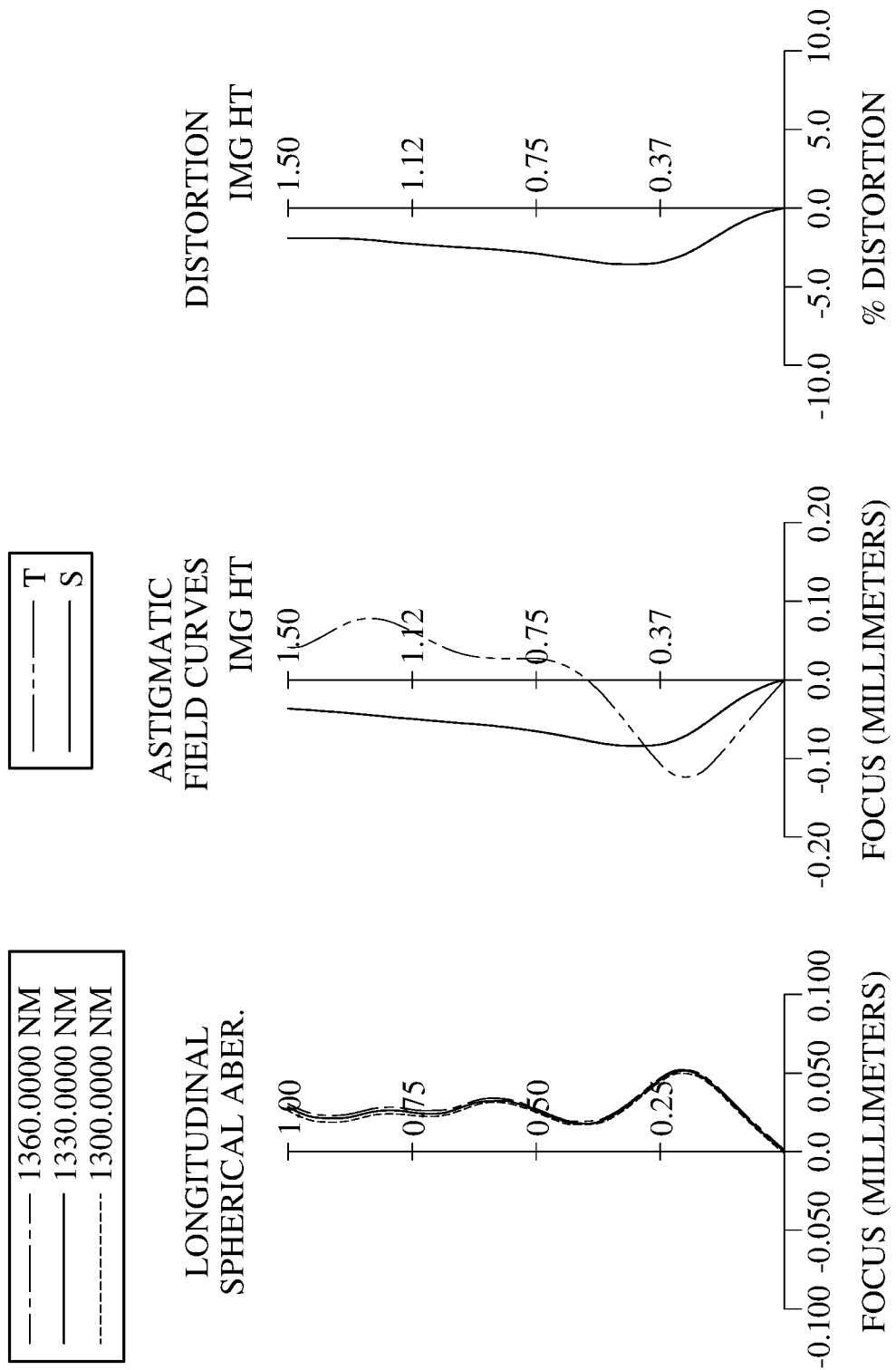
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 470. The photographing optical lens assembly includes, in order from an object side to an image side, a first lens element 410, an aperture stop 400, a second lens element 420, a stop 401, a third lens element 430, a fourth lens element 440, a filter 450 and an image surface 460. The photographing optical lens assembly includes four single and non-cemented lens elements (410, 420, 430 and 440) with no additional lens element disposed between each of the adjacent four lens elements, wherein there is an air gap between each of all adjacent lens elements.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has at least one inflection point in an off-axis region thereof.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has at least one convex shape in an off-axis region thereof.

The filter 450 is made of glass material and located between the fourth lens element 440 and the image surface 460, and will not affect the focal length of the photographing optical lens assembly. The image sensor 470 is disposed on or near the image surface 460 of the photographing optical lens assembly.

In this embodiment, the focal length of the photographing optical lens assembly at the wavelength of 1330 nm (i.e., infrared light) is f, the axial distance between the object-side surface 411 of the first lens element 410 and the image-side surface 442 of the fourth lens element 440 is TD, and the axial distance between the image-side surface 442 of the fourth lens element 440 and the image surface 460 is BL.

The detailed optical data of the 4th embodiment are shown in Table 7 and the aspheric surface data are shown in Table 8 below.

TABLE 7

4th Embodiment

| | | f = 3.58 mm, Fno = 1.10, HFOV = 23.0 deg. | | | | | fd = 3.38 mm | |
|---|---|---|---|---|---|---|---|---|
| Surface # | | Curvature Radius | Thickness | Material | Index | Abbe # | Focal Length | Index | Focal Length |
| 0 | Object | Plano | 20000.000 | | | | | | |
| 1 | Lens 1 | 1.275 (ASP) | 0.313 | Plastic | 1.633 | 19.4 | −6.88 | 1.669 | −6.61 |
| 2 | | 0.892 (ASP) | 0.315 | | | | | | |
| 3 | Ape. Stop | Plano | −0.041 | | | | | | |
| 4 | Lens 2 | 1.406 (ASP) | 1.211 | Plastic | 1.610 | 23.5 | 2.19 | 1.639 | 2.09 |
| 5 | | −18.061 (ASP) | 0.306 | | | | | | |
| 6 | Stop | Plano | 0.528 | | | | | | |
| 7 | Lens 3 | −1.028 (ASP) | 0.422 | Plastic | 1.633 | 19.4 | 3.92 | 1.669 | 3.65 |
| 8 | | −0.842 (ASP) | 0.030 | | | | | | |
| 9 | Lens 4 | 1.588 (ASP) | 0.286 | Plastic | 1.633 | 19.4 | −3.94 | 1.669 | −3.75 |
| 10 | | 0.902 (ASP) | 0.700 | | | | | | |
| 11 | Filter | Plano | 0.210 | Glass | 1.504 | 64.2 | — | 1.517 | — |
| 12 | | Plano | 0.621 | | | | | | |
| 13 | Image | Plano | — | | | | | | |

Reference wavelength to refractive index and focal length is 1330 nm.
Reference wavelength to Abbe number is 587.6 nm (d-line).
An effective radius of the stop 401 (Surface 6) is 1.500 mm.
An effective radius of the image-side surface 442 (Surface 10) is 1.380 mm.
Reference wavelength is 587.6 nm (d-line).

TABLE 8

Aspheric Coefficients

| Surface # | 1 | 2 | 4 | 5 |
|---|---|---|---|---|
| k = | −6.4548E+00 | −2.1238E+00 | −5.1219E−01 | −9.0000E+01 |
| A4 = | 9.6083E−02 | −1.2888E−01 | −9.6801E−02 | −1.8718E−02 |
| A6 = | −1.6667E−01 | 8.5108E−02 | 5.4024E−02 | 1.3301E−02 |
| A8 = | 1.2257E−01 | −8.3258E−02 | −5.2950E−02 | −1.8825E−02 |
| A10 = | −5.5111E−02 | 3.9883E−02 | 2.1740E−02 | 7.7786E−03 |
| A12 = | 1.2588E−02 | −9.2674E−03 | −4.2976E−03 | −1.3706E−03 |
| A14 = | −1.0993E−03 | 8.8252E−04 | 3.0401E−04 | 8.0124E−05 |

TABLE 8-continued

| Aspheric Coefficients | | | | |
|---|---|---|---|---|
| Surface # | 7 | 8 | 9 | 10 |
| k = | −3.1650E+00 | −3.5046E+00 | −4.8296E+00 | −1.3250E+01 |
| A4 = | −3.1484E−02 | 1.8164E−01 | 7.5945E−02 | 3.2539E−01 |
| A6 = | −5.9992E−02 | −7.5467E−01 | −3.2362E−01 | −9.1368E−01 |
| A8 = | 1.7705E−01 | 1.4506E+00 | 3.8650E−01 | 1.3004E+00 |
| A10 = | −1.3648E−01 | −1.5350E+00 | −2.8285E−01 | −1.1748E+00 |
| A12 = | 5.2852E−02 | 9.6746E−01 | 1.0092E−01 | 6.3462E−01 |
| A14 = | −1.0392E−02 | −3.3560E−01 | −9.4699E−03 | −1.8669E−01 |
| A16 = | 8.5420E−04 | 4.9445E−02 | −2.4286E−03 | 2.2894E−02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.58 | TL [mm] | 4.90 |
| fd/EPD | 1.10 | TL/ImgH | 3.27 |
| HFOV [deg.] | 23.0 | TD/BL | 2.44 |
| Number of lens elements | 4 | BL/ΣAT | 1.21 |
| EPD/ImgH | 2.05 | |R3/R4| | 0.08 |
| tan(HFOV) | 0.42 | fd/R1 | 2.65 |
| Vdmax | 23.49 | |fd2/fd1| | 0.32 |
| Vd1 | 19.44 | |fd2/fd3| | 0.57 |
| Vd1 + Vd2 + Vd3 + Vd4 | 81.81 | |fd3/fd2| | 1.74 |
| Vd3 + Vd4 + Vd5 | — | — | — |

5th Embodiment

Figure 9:
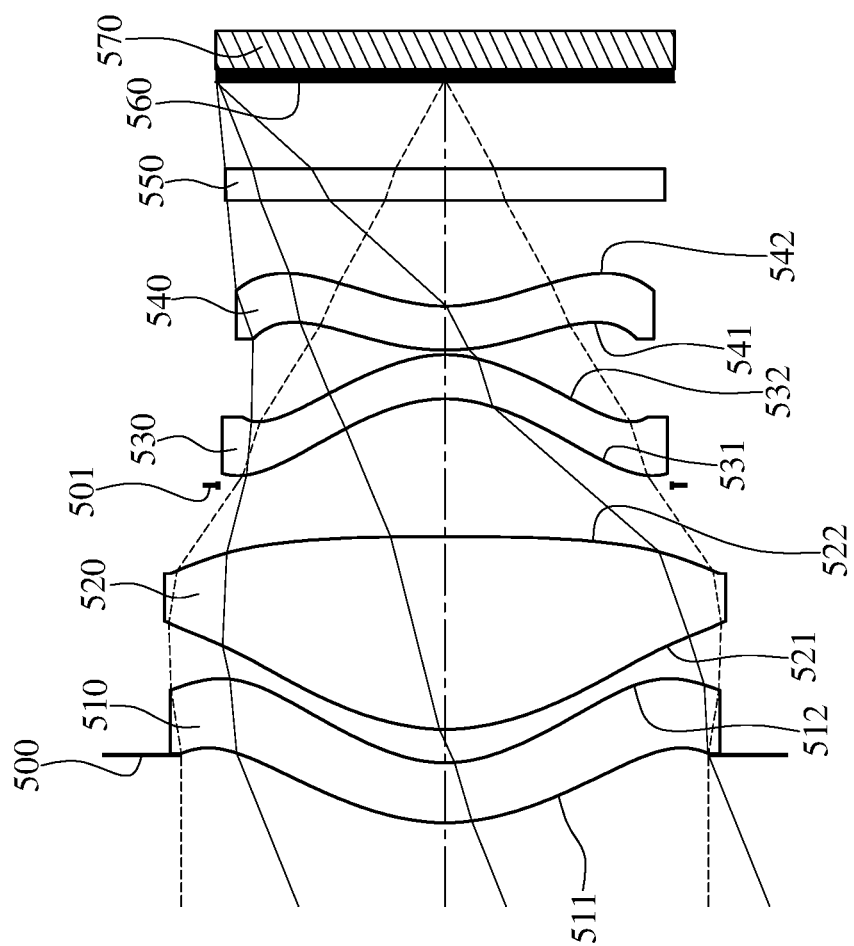
FIG. 9 is a schematic view of an image capturing unit according to the 5th embodiment of the present disclosure.
Figure 10:
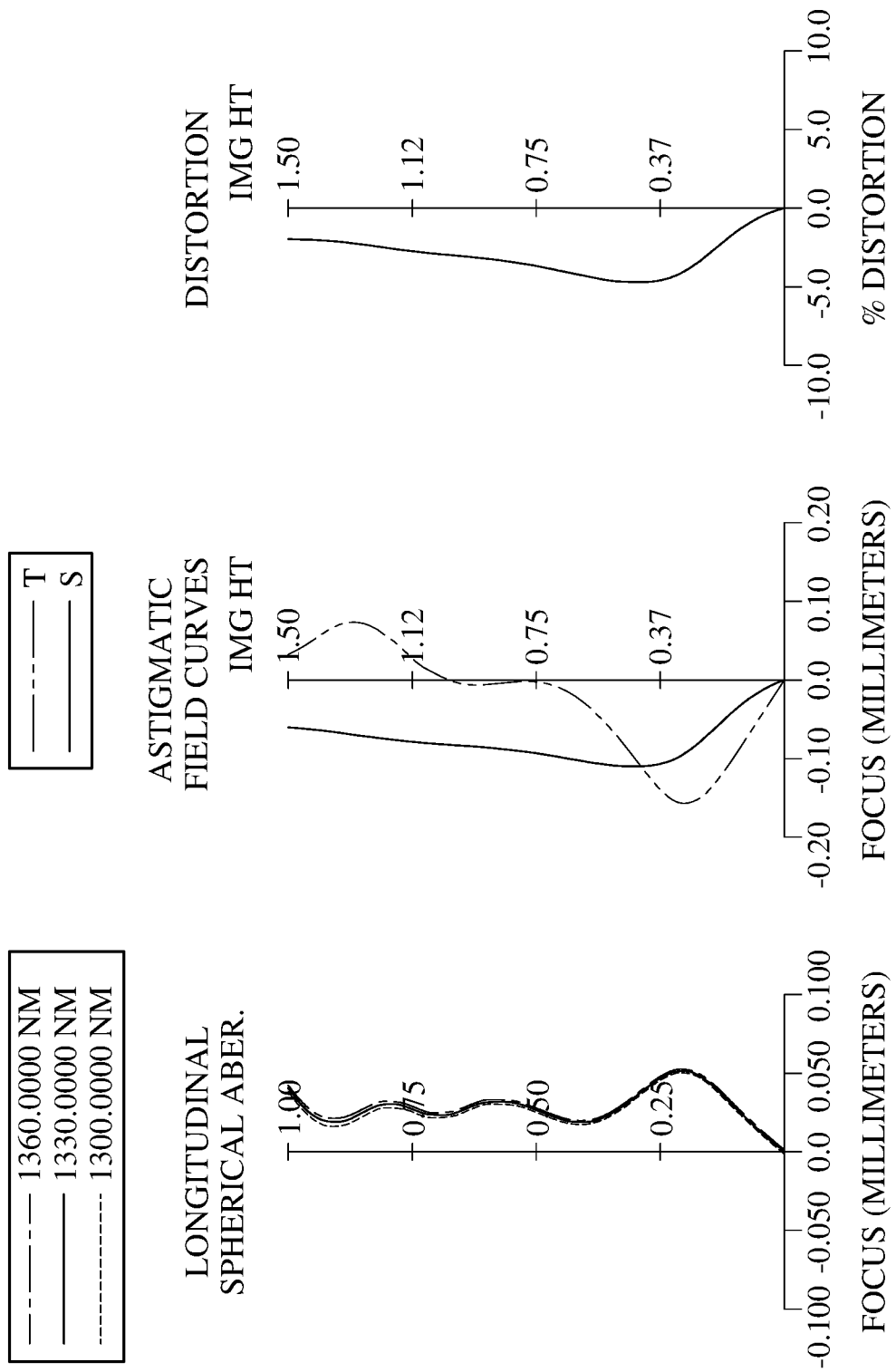
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 570. The photographing optical lens assembly includes, in order from an object side to an image side, an aperture stop 500, a first lens element 510, a second lens element 520, a stop 501, a third lens element 530, a fourth lens element 540, a filter 550 and an image surface 560. The photographing optical lens assembly includes four single and non-cemented lens elements (510, 520, 530 and 540) with no additional lens element disposed between each of the adjacent four lens elements, wherein there is an air gap between each of all adjacent lens elements.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one inflection point in an off-axis region thereof.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The image-side surface 542 of the fourth lens element 540 has at least one convex shape in an off-axis region thereof.

The filter 550 is made of glass material and located between the fourth lens element 540 and the image surface 560, and will not affect the focal length of the photographing optical lens assembly. The image sensor 570 is disposed on or near the image surface 560 of the photographing optical lens assembly.

In this embodiment, the focal length of the photographing optical lens assembly at the wavelength of 1330 nm (i.e., infrared light) is f, the axial distance between the object-side surface 511 of the first lens element 510 and the image-side surface 542 of the fourth lens element 540 is TD, and the axial distance between the image-side surface 542 of the fourth lens element 540 and the image surface 560 is BL.

The detailed optical data of the 5th embodiment are shown in Table 9 and the aspheric surface data are shown in Table 10 below.

TABLE 9

5th Embodiment f = 3.76 mm, Fno = 1.08, HFOV = 22.0 deg.     fd = 3.55 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | 15000.000 | | | | | | |
| 1 | Ape. Stop | Plano | | −0.448 | | | | | | |
| 2 | Lens 1 | 1.316 | (ASP) | 0.397 | Plastic | 1.633 | 19.4 | −6.86 | 1.669 | −6.61 |
| 3 | | 0.892 | (ASP) | 0.221 | | | | | | |
| 4 | Lens 2 | 1.376 | (ASP) | 1.275 | Plastic | 1.610 | 23.5 | 2.20 | 1.639 | 2.10 |
| 5 | | −32.499 | (ASP) | 0.340 | | | | | | |
| 6 | Stop | Plano | | 0.571 | | | | | | |
| 7 | Lens 3 | −0.905 | (ASP) | 0.293 | Plastic | 1.633 | 19.4 | 4.80 | 1.669 | 4.47 |
| 8 | | −0.785 | (ASP) | 0.030 | | | | | | |
| 9 | Lens 4 | 1.593 | (ASP) | 0.290 | Plastic | 1.633 | 19.4 | −4.48 | 1.669 | −4.26 |
| 10 | | 0.948 | (ASP) | 0.700 | | | | | | |
| 11 | Filter | Plano | | 0.210 | Glass | 1.504 | 64.2 | — | 1.517 | — |
| 12 | | Plano | | 0.574 | | | | | | |
| 13 | Image | Plano | | — | | | | | | |

Reference wavelength to refractive index and focal length is 1330 nm.
Reference wavelength to Abbe number is 587.6 nm (d-line).
An effective radius of the stop 501 (Surface 6) is 1.500 mm.
An effective radius of the image-side surface 542 (Surface 10) is 1.380 mm.

Reference wavelength is 587.6 nm (d-line).

TABLE 10

Aspheric Coefficients

| Surface # | 2 | 3 | 4 | 5 |
|---|---|---|---|---|
| k = | −5.5898E+00 | −1.8046E+00 | −5.7827E−01 | −1.9598E+01 |
| A4 = | 7.7974E−02 | −1.6232E−01 | −1.2399E−01 | −1.4321E−02 |
| A6 = | −6.6345E−02 | 1.8106E−01 | 7.0585E−02 | −1.3615E−02 |
| A8 = | 3.3119E−02 | −1.2677E−01 | −3.2880E−02 | 1.8875E−02 |
| A10 = | −1.1866E−02 | 4.1293E−02 | 3.5068E−03 | −1.1007E−02 |
| A12 = | 1.8411E−03 | −6.3806E−03 | 9.8603E−04 | 2.7903E−03 |
| A14 = | −7.3613E−05 | 3.8773E−04 | −1.9163E−04 | −2.5454E−04 |

| Surface # | 7 | 8 | 9 | 10 |
|---|---|---|---|---|
| k = | −3.0967E+00 | −3.6881E+00 | −1.3341E+01 | −1.7821E+01 |
| A4 = | 3.2639E−02 | 1.6721E−01 | 4.2124E−01 | 4.4921E−01 |
| A6 = | −2.1804E−01 | −7.3915E−01 | −1.2702E+00 | −1.2129E+00 |
| A8 = | 3.5028E−01 | 1.3392E+00 | 2.0372E+00 | 1.6898E+00 |
| A10 = | −2.4311E−01 | −1.3180E+00 | −2.1823E+00 | −1.5088E+00 |
| A12 = | 9.0730E−02 | 7.7399E−01 | 1.4395E+00 | 8.2003E−01 |
| A14 = | −1.7511E−02 | −2.5206E−01 | −5.2612E−01 | −2.4640E−01 |
| A16 = | 1.3825E−03 | 3.5265E−02 | 8.0361E−02 | 3.1214E−02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.76 | TL [mm] | 4.90 |
| fd/EPD | 1.08 | TL/ImgH | 3.27 |
| HFOV [deg.] | 22.0 | TD/BL | 2.58 |
| Number of lens elements | 4 | BL/ΣAT | 1.14 |
| EPD/ImgH | 2.19 | |R3/R4| | 0.04 |
| tan(HFOV) | 0.40 | fd/R1 | 2.70 |

| 5th Embodiment | | | |
|---|---|---|---|
| Vdmax | 23.49 | |fd2/fd1| | 0.32 |
| Vd1 | 19.44 | |fd2/fd3| | 0.47 |
| Vd1 + Vd2 + Vd3 + Vd4 | 81.81 | |fd3/fd2| | 2.13 |
| Vd3 + Vd4 + Vd5 | — | | — |

6th Embodiment

Figure 11:
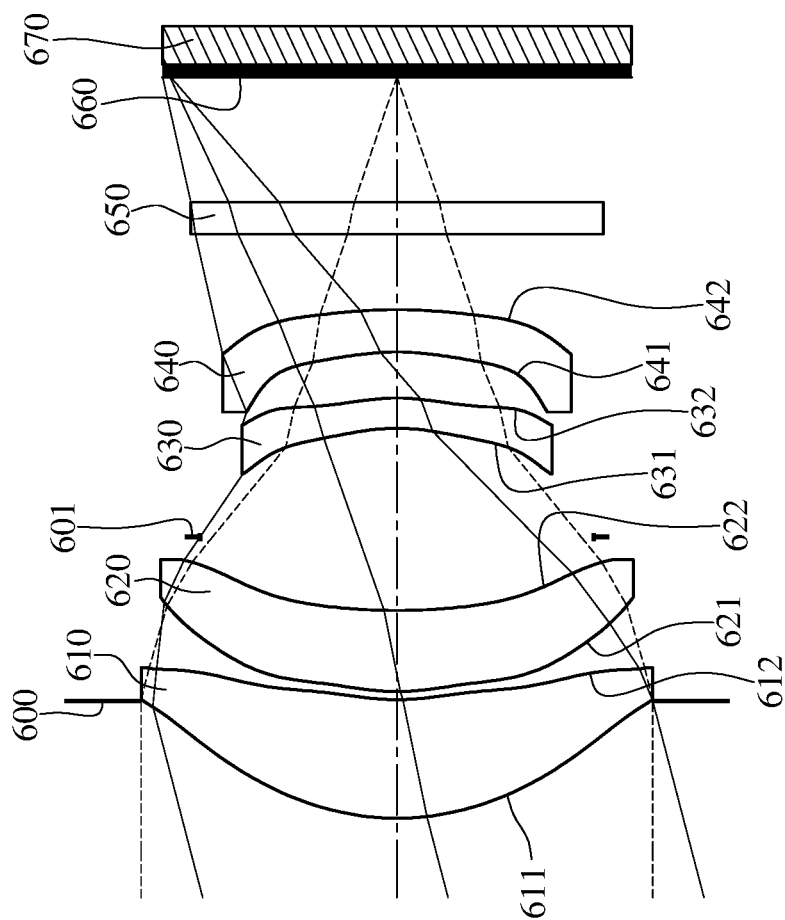
FIG. 11 is a schematic view of an image capturing unit according to the 6th embodiment of the present disclosure.
Figure 12:
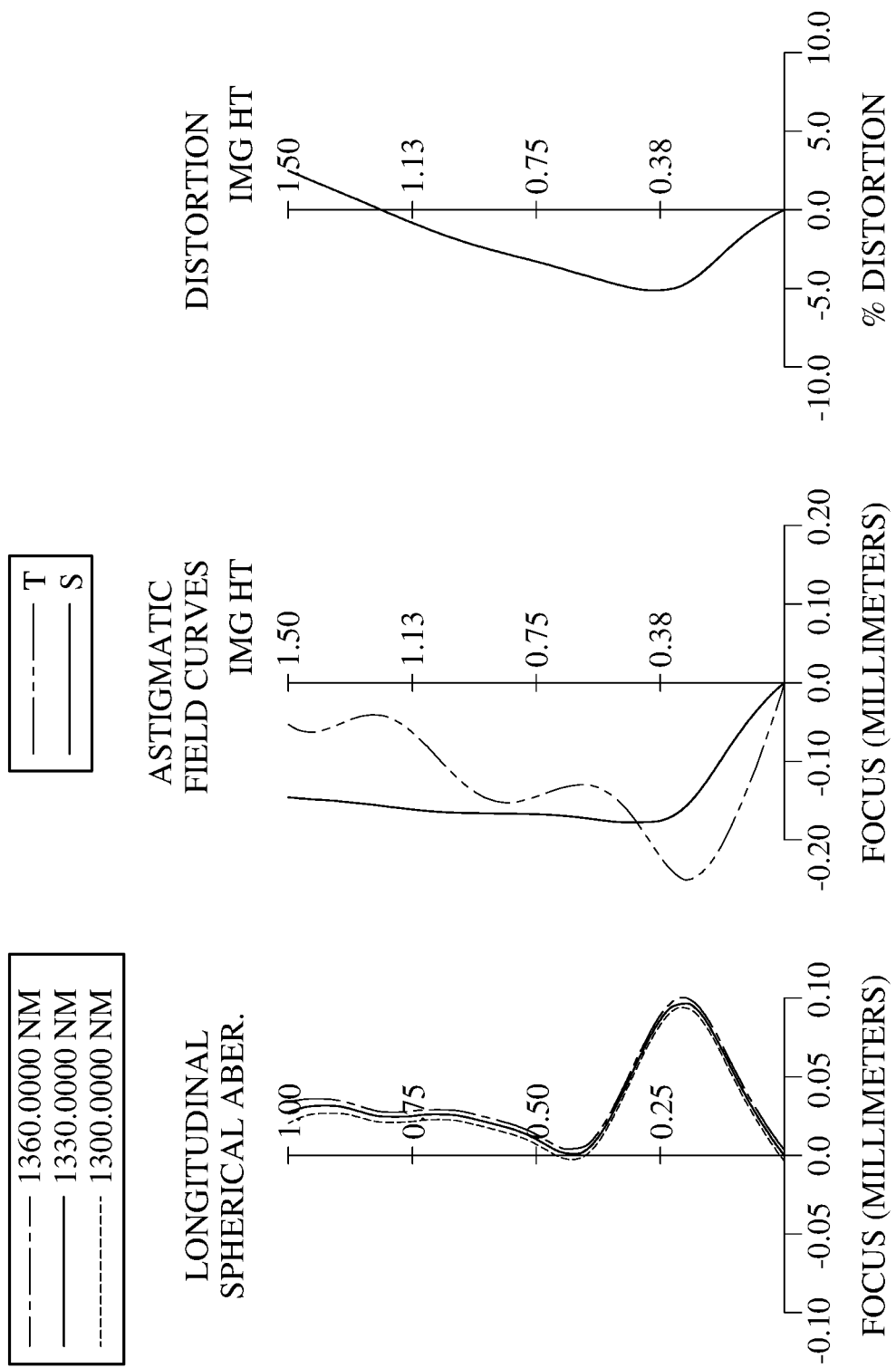
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 670. The photographing optical lens assembly includes, in order from an object side to an image side, an aperture stop 600, a first lens element 610, a second lens element 620, a stop 601, a third lens element 630, a fourth lens element 640, a filter 650 and an image surface 660. The photographing optical lens assembly includes four single and non-cemented lens elements (610, 620, 630 and 640) with no additional lens element disposed between each of the adjacent four lens elements, wherein there is an air gap between each of all adjacent lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one inflection point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. The image-side surface 632 of the third lens element 630 has at least one convex shape in an off-axis region thereof.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The image-side surface 642 of the fourth lens element 640 has at least one convex shape in an off-axis region thereof.

The filter 650 is made of glass material and located between the fourth lens element 640 and the image surface 660, and will not affect the focal length of the photographing optical lens assembly. The image sensor 670 is disposed on or near the image surface 660 of the photographing optical lens assembly.

In this embodiment, the focal length of the photographing optical lens assembly at the wavelength of 1330 nm (i.e., infrared light) is f, the axial distance between the object-side surface 611 of the first lens element 610 and the image-side surface 642 of the fourth lens element 640 is TD, and the axial distance between the image-side surface 642 of the fourth lens element 640 and the image surface 660 is BL.

The detailed optical data of the 6th embodiment are shown in Table 11 and the aspheric surface data are shown in Table 12 below.

TABLE 11

6th Embodiment f = 5.57 mm, Fno = 1.65, HFOV = 14.6 deg.   fd = 5.10 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | 20000.000 | | | | | | |
| 1 | Ape. Stop | Plano | | −0.775 | | | | | | |
| 2 | Lens 1 | 1.662 | (ASP) | 0.784 | Plastic | 1.610 | 23.5 | 1346.37 | 1.639 | 312.00 |
| 3 | | 1.367 | (ASP) | 0.054 | | | | | | |
| 4 | Lens 2 | 1.320 | (ASP) | 0.537 | Plastic | 1.610 | 23.5 | 3.05 | 1.639 | 2.90 |
| 5 | | 3.859 | (ASP) | 0.487 | | | | | | |
| 6 | Stop | Plano | | 0.718 | | | | | | |
| 7 | Lens 3 | −1.307 | (ASP) | 0.200 | Plastic | 1.633 | 19.4 | 1569.41 | 1.669 | 600.00 |
| 8 | | −1.383 | (ASP) | 0.305 | | | | | | |
| 9 | Lens 4 | −1.322 | (ASP) | 0.280 | Plastic | 1.633 | 19.4 | −4.21 | 1.669 | −3.99 |
| 10 | | −2.841 | (ASP) | 0.500 | | | | | | |
| 11 | Filter | Plano | | 0.210 | Glass | 1.504 | 64.2 | — | 1.517 | — |
| 12 | | Plano | | 0.827 | | | | | | |
| 13 | Image | Plano | | — | | | | | | |

Reference wavelength to refractive index and focal length is 1330 nm.   Reference wavelength
Reference wavelength to Abbe number is 587.6 nm (d-line).   is 587.6 nm (d-line).
An effective radius of the stop 601 (Surface 6) is 1.300 mm.

TABLE 12

Aspheric Coefficients

| Surface # | 2 | 3 | 4 | 5 |
|---|---|---|---|---|
| k = | −5.6344E+00 | −2.5173E+00 | −7.3954E−01 | 2.4280E+00 |
| A4 = | 8.2353E−02 | −8.5493E−01 | −9.3801E−01 | −5.5044E−02 |
| A6 = | −2.2387E−04 | 1.3464E+00 | 1.4141E+00 | 1.4906E−01 |
| A8 = | −3.4019E−02 | −1.0267E+00 | −1.0051E+00 | −2.3560E−02 |
| A10 = | 2.8375E−02 | 4.2020E−01 | 3.7213E−01 | −6.9999E−02 |
| A12 = | −1.0305E−02 | −8.9949E−02 | −6.8500E−02 | 3.7444E−02 |
| A14 = | 1.3408E−03 | 7.9818E−03 | 4.9242E−03 | −5.6053E−03 |

TABLE 12-continued

| Aspheric Coefficients | | | | |
|---|---|---|---|---|
| Surface # | 7 | 8 | 9 | 10 |
| k = | −3.1030E+00 | −3.8590E+00 | −9.0000E+01 | −6.6243E+01 |
| A4 = | 3.8290E−01 | 5.4146E−01 | −9.7866E−01 | −1.4566E−02 |
| A6 = | 1.9577E−01 | 2.5192E−01 | 6.1472E+00 | 1.3471E−02 |
| A8 = | −3.0269E+00 | −2.4223E+00 | −2.1100E+01 | −1.2264E−01 |
| A10 = | 7.3493E+00 | 3.9672E+00 | 4.1615E+01 | −1.6700E−02 |
| A12 = | −1.0177E+01 | −4.2152E+00 | −4.7787E+01 | 7.1633E−02 |
| A14 = | 7.3762E+00 | 2.6650E+00 | 2.8510E+01 | −2.9283E−02 |
| A16 = | −2.0845E+00 | −6.7511E−01 | −6.7227E+00 | 7.7486E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.57 | TL [mm] | 4.90 |
| fd/EPD | 1.65 | TL/ImgH | 3.27 |
| HFOV [deg.] | 14.6 | TD/BL | 2.72 |
| Number of lens elements | 4 | BL/ΣAT | 0.79 |
| EPD/ImgH | 2.06 | |R3/R4| | 0.34 |
| tan(HFOV) | 0.26 | fd/R1 | 3.07 |
| Vdmax | 23.49 | |fd2/fd1| | 0.01 |
| Vd1 | 23.49 | |fd2/fd3| | 0.0048 |
| Vd1 + Vd2 + Vd3 + Vd4 | 85.86 | |fd3/fd2| | 206.84 |
| Vd3 + Vd4 + Vd5 | — | — | — |

7th Embodiment

Figure 13:
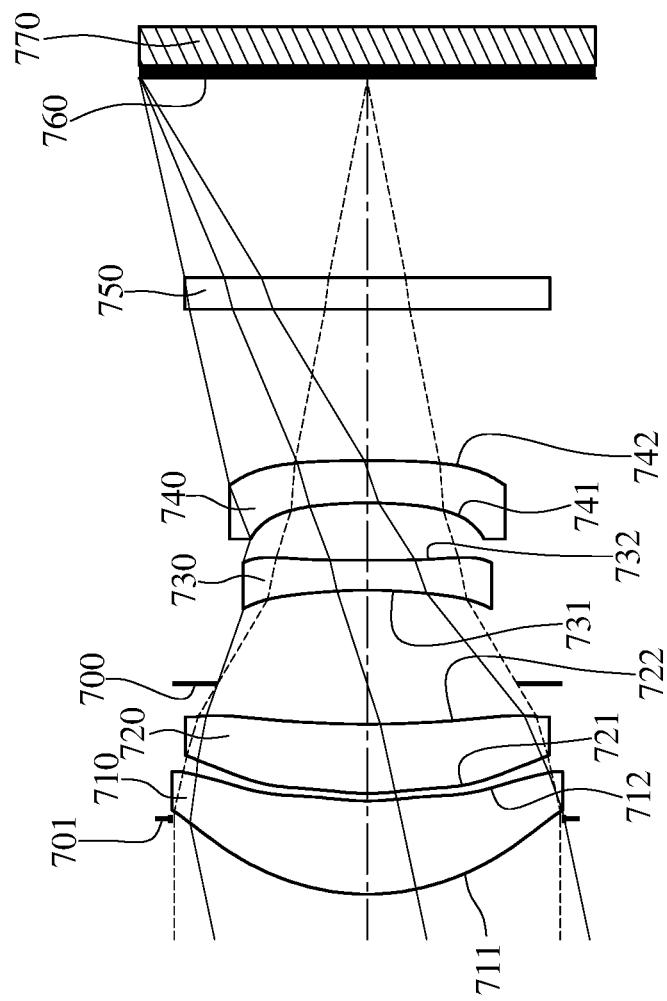
FIG. 13 is a schematic view of an image capturing unit according to the 7th embodiment of the present disclosure.
Figure 14:
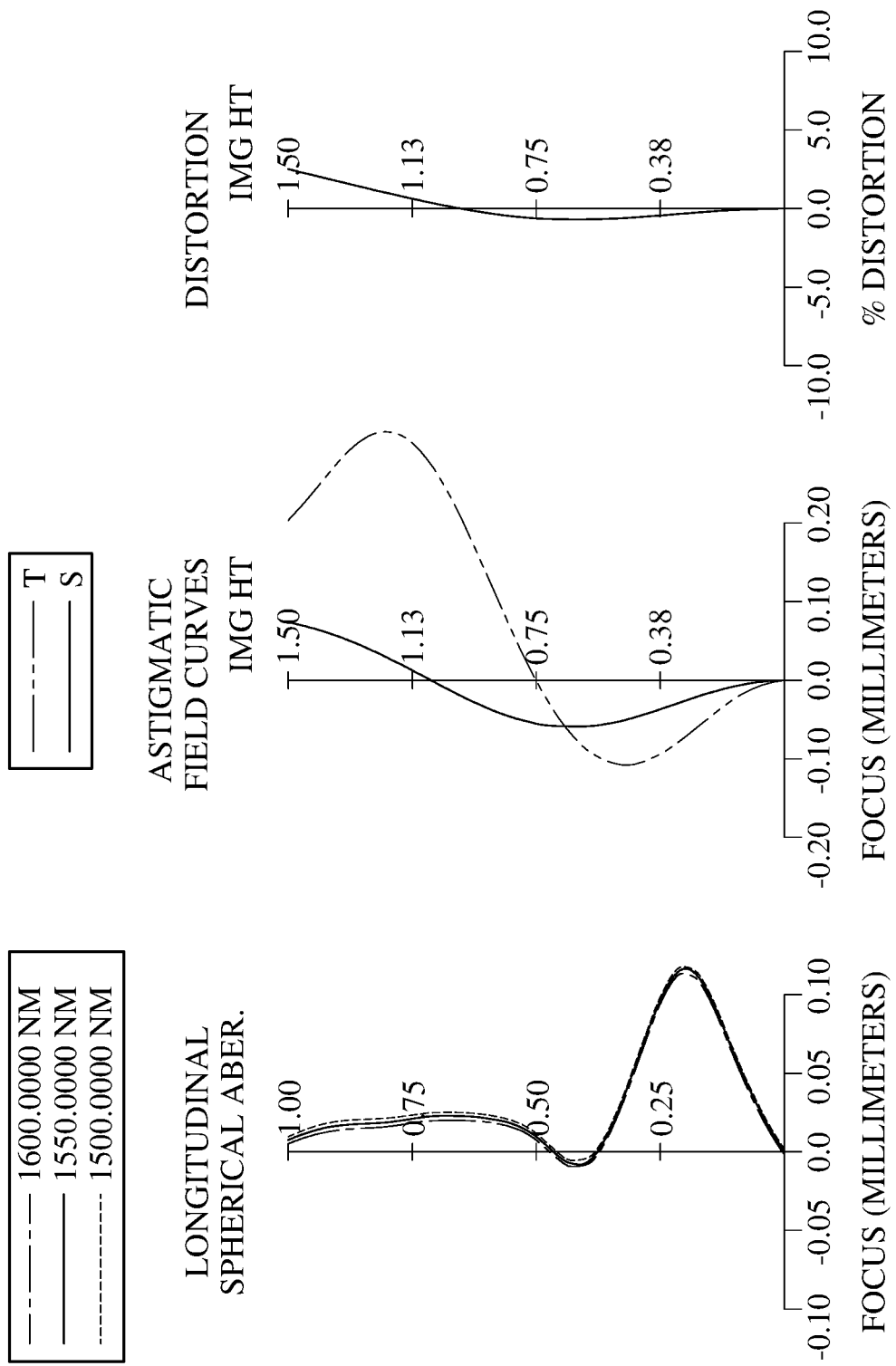
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 770. The photographing optical lens assembly includes, in order from an object side to an image side, a stop 701, a first lens element 710, a second lens element 720, an aperture stop 700, a third lens element 730, a fourth lens element 740, a filter 750 and an image surface 760. The photographing optical lens assembly includes four single and non-cemented lens elements (710, 720, 730 and 740) with no additional lens element disposed between each of the adjacent four lens elements, wherein there is an air gap between each of all adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one inflection point in an off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. The image-side surface 732 of the third lens element 730 has at least one convex shape in an off-axis region thereof.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The filter 750 is made of glass material and located between the fourth lens element 740 and the image surface 760, and will not affect the focal length of the photographing optical lens assembly. The image sensor 770 is disposed on or near the image surface 760 of the photographing optical lens assembly.

In this embodiment, the axial distance between the object-side surface 711 of the first lens element 710 and the image-side surface 742 of the fourth lens element 740 is TD, and the axial distance between the image-side surface 742 of the fourth lens element 740 and the image surface 760 is BL.

The detailed optical data of the 7th embodiment are shown in Table 13 and the aspheric surface data are shown in Table 14 below.

TABLE 13

7th Embodiment f = 6.83 mm, Fno = 2.68, HFOV= 12.0 deg.          fd = 6.76 mm

| Surface # | | Curvature Radius | | Thickness | Material | Index | Abbe # | Focal Length | Index | Focal Length |
|---|---|---|---|---|---|---|---|---|---|---|
| 0 | Object | Plano | | 15000.000 | | | | | | |
| 1 | Stop | Plano | | −0.500 | | | | | | |
| 2 | Lens 1 | 1.482 | (ASP) | 0.617 | Plastic | 1.531 | 55.9 | 32.02 | 1.544 | 30.41 |
| 3 | | 1.389 | (ASP) | 0.050 | | | | | | |
| 4 | Lens 2 | 1.329 | (ASP) | 0.458 | Plastic | 1.531 | 55.9 | 3.22 | 1.544 | 3.14 |
| 5 | | 5.268 | (ASP) | 0.267 | | | | | | |
| 6 | Ape. Stop | Plano | | 0.620 | | | | | | |
| 7 | Lens 3 | −2.853 | (ASP) | 0.199 | Plastic | 1.627 | 19.4 | −5.26 | 1.669 | −4.93 |
| 8 | | −21.828 | (ASP) | 0.378 | | | | | | |
| 9 | Lens 4 | −2.953 | (ASP) | 0.280 | Plastic | 1.627 | 19.4 | −6.66 | 1.669 | −6.24 |
| 10 | | −10.486 | (ASP) | 1.000 | | | | | | |
| 11 | Filter | Plano | | 0.210 | Glass | 1.501 | 64.2 | — | 1.517 | — |
| 12 | | Plano | | 1.320 | | | | | | |
| 13 | Image | Plano | | — | | | | | | |

Reference wavelength to refractive index and focal length is 1550 nm.
Reference wavelength to Abbe number is 587.6 nm (d-line).
An effective radius of the stop 701 (Surface 1) is 1.300 mm.

Reference wavelength is 587.6 nm (d-line).

TABLE 14

Aspheric Coefficients

| Surface # | 2 | 3 | 4 | 5 |
|---|---|---|---|---|
| k = | −5.1439E+00 | −2.3200E+00 | −9.6626E−01 | −8.8647E+01 |
| A4 = | 9.6927E−02 | −1.5839E+00 | −1.7371E+00 | −1.4915E−01 |
| A6 = | 3.4765E−02 | 4.1792E+00 | 4.6250E+00 | 7.1833E−01 |
| A8 = | −9.1892E−02 | −5.1751E+00 | −5.8391E+00 | −1.2984E+00 |
| A10 = | 9.0286E−02 | 3.4068E+00 | 3.8863E+00 | 1.1458E+00 |
| A12 = | −4.7417E−02 | −1.1655E+00 | −1.3217E+00 | −5.1522E−01 |
| A14 = | 9.0076E−03 | 1.6445E−01 | 1.8123E−01 | 9.3268E−02 |

| Surface # | 7 | 8 | 9 | 10 |
|---|---|---|---|---|
| k = | 6.6577E+00 | 4.7217E+01 | −6.1867E+00 | −5.7034E+01 |
| A4 = | 4.0522E−01 | 2.9243E−01 | 2.3816E−01 | −1.7365E−01 |
| A6 = | −1.2449E+00 | 1.0717E+00 | −4.5978E+00 | 7.2644E−01 |
| A8 = | 4.6567E+00 | −9.1360E+00 | 3.0972E+01 | −3.9395E+00 |
| A10 = | −1.8670E+01 | 2.3195E+01 | −1.2654E+02 | 9.6190E+00 |
| A12 = | 4.2474E+01 | −2.7798E+01 | 2.8562E+02 | −1.2684E+01 |
| A14 = | −4.7702E+01 | 1.2627E+01 | −3.3529E+02 | 8.5017E+00 |
| A16 = | 2.0841E+01 | 7.2893E−02 | 1.5744E+02 | −2.2344E+00 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

7th Embodiment

| | | | |
|---|---|---|---|
| f [mm] | 6.83 | TL [mm] | 5.40 |
| fd/EPD | 2.68 | TL/ImgH | 3.60 |
| HFOV [deg.] | 12.0 | TD/BL | 1.18 |
| Number of lens elements | 4 | BL/ΣAT | 1.85 |
| EPD/ImgH | 1.68 | |R3/R4| | 0.25 |
| tan(HFOV) | 0.21 | fd/R1 | 4.56 |
| Vdmax | 55.94 | |fd2/fd1| | 0.10 |

-continued

7th Embodiment

| | | | |
|---|---|---|---|
| Vd1 | 55.94 | |fd2/fd3| | 0.64 |
| Vd1 + Vd2 + Vd3 + Vd4 | 150.75 | |fd3/fd2| | 1.57 |
| Vd3 + Vd4 + Vd5 | — | | — |

8th Embodiment

Figure 15:
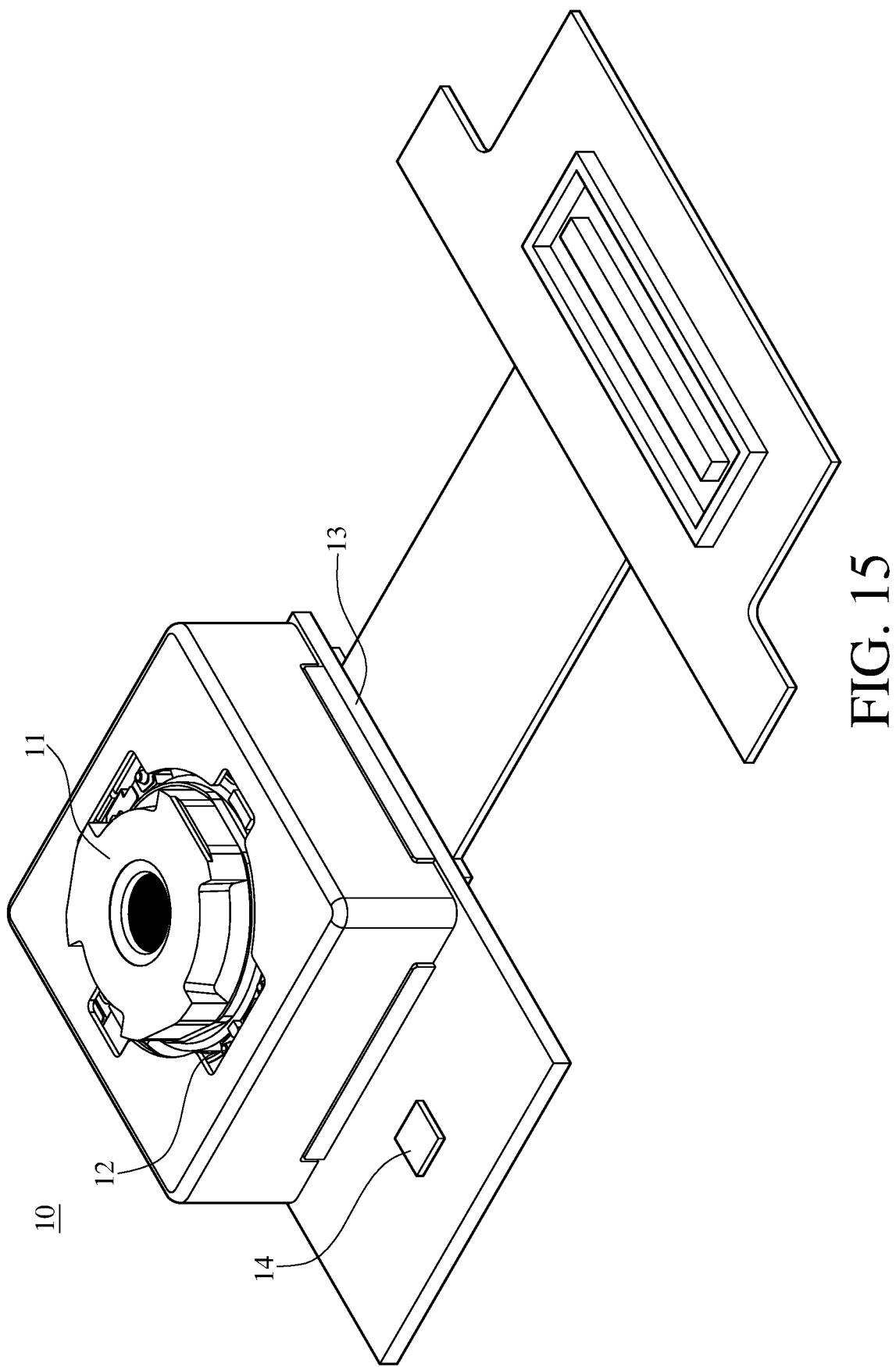
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 10 is a camera module including a lens unit 11, a driving device 12, an image sensor 13 and an image stabilizer 14. The lens unit 11 includes the photographing optical lens assembly disclosed in the 1st embodiment, a barrel and a holder member (their reference numerals are omitted) for holding the photographing optical lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

9th Embodiment

Figure 16:
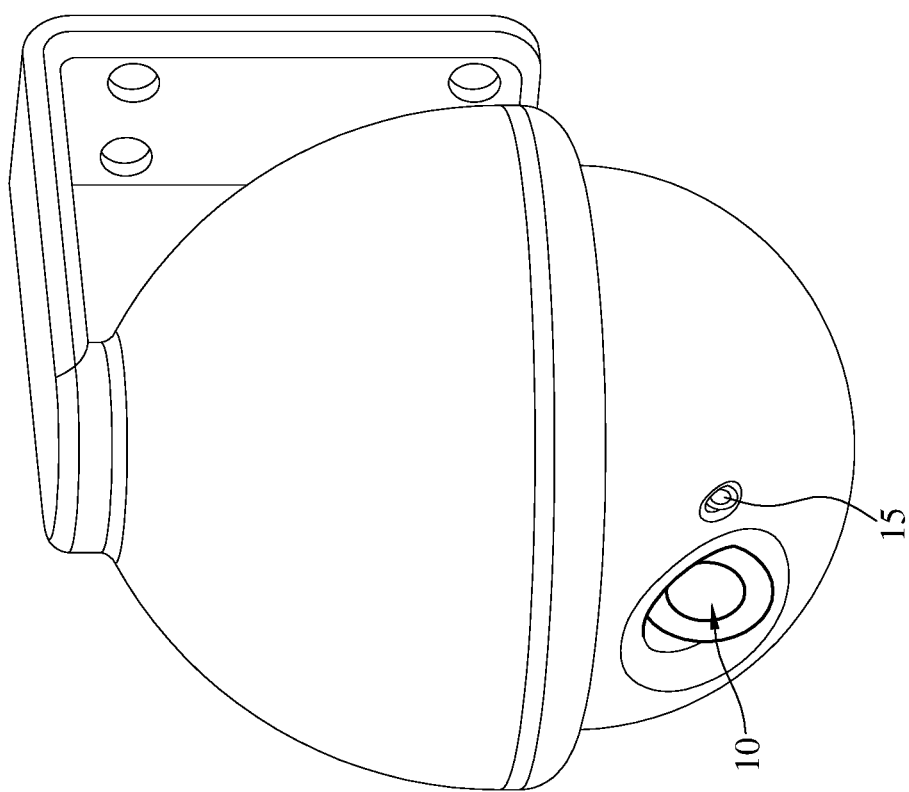
FIG. 16 is one perspective view of an electronic device according to the 9th embodiment of the present disclosure.

FIG. 16 is one perspective view of an electronic device according to the 9th embodiment of the present disclosure. In this embodiment, an electronic device 20 is a net surveillance device including the image capturing unit 10 disclosed in the 8th embodiment and a light source 15. The light source 15 is disposed on one side of the photographing optical lens assembly, and the light source 15 is configured to generate light within a wavelength range of 1200 nm to 1800 nm (i.e., infrared light). Infrared light with the wavelength range of 1200 nm to 1800 nm has less influence on human eyes, thereby providing a better user experience. However, the present disclosure is not limited to the wavelength range.

Figure 17:
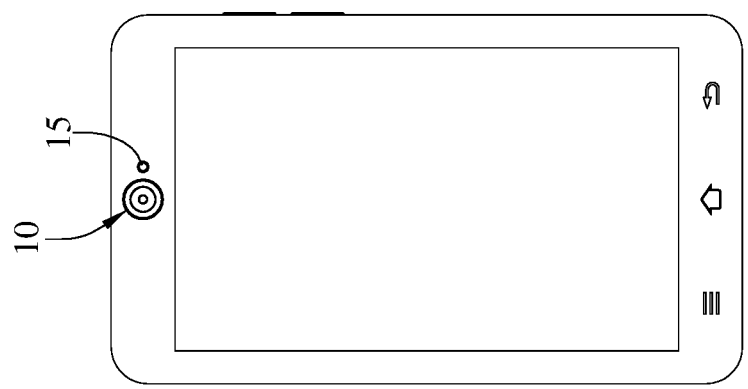
FIG. 17 is a perspective view of another electronic device of the present disclosure.
Figure 18:
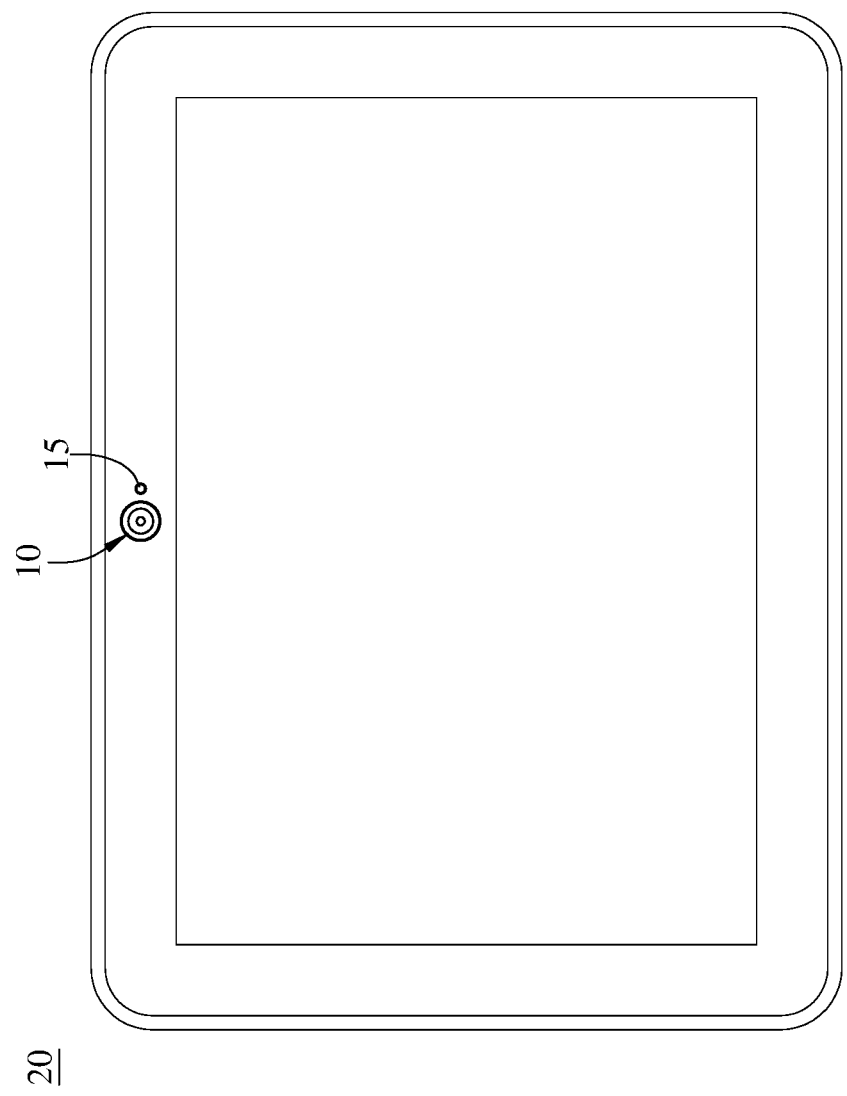
FIG. 18 is a perspective view of still another electronic device of the present disclosure.
Figure 19:
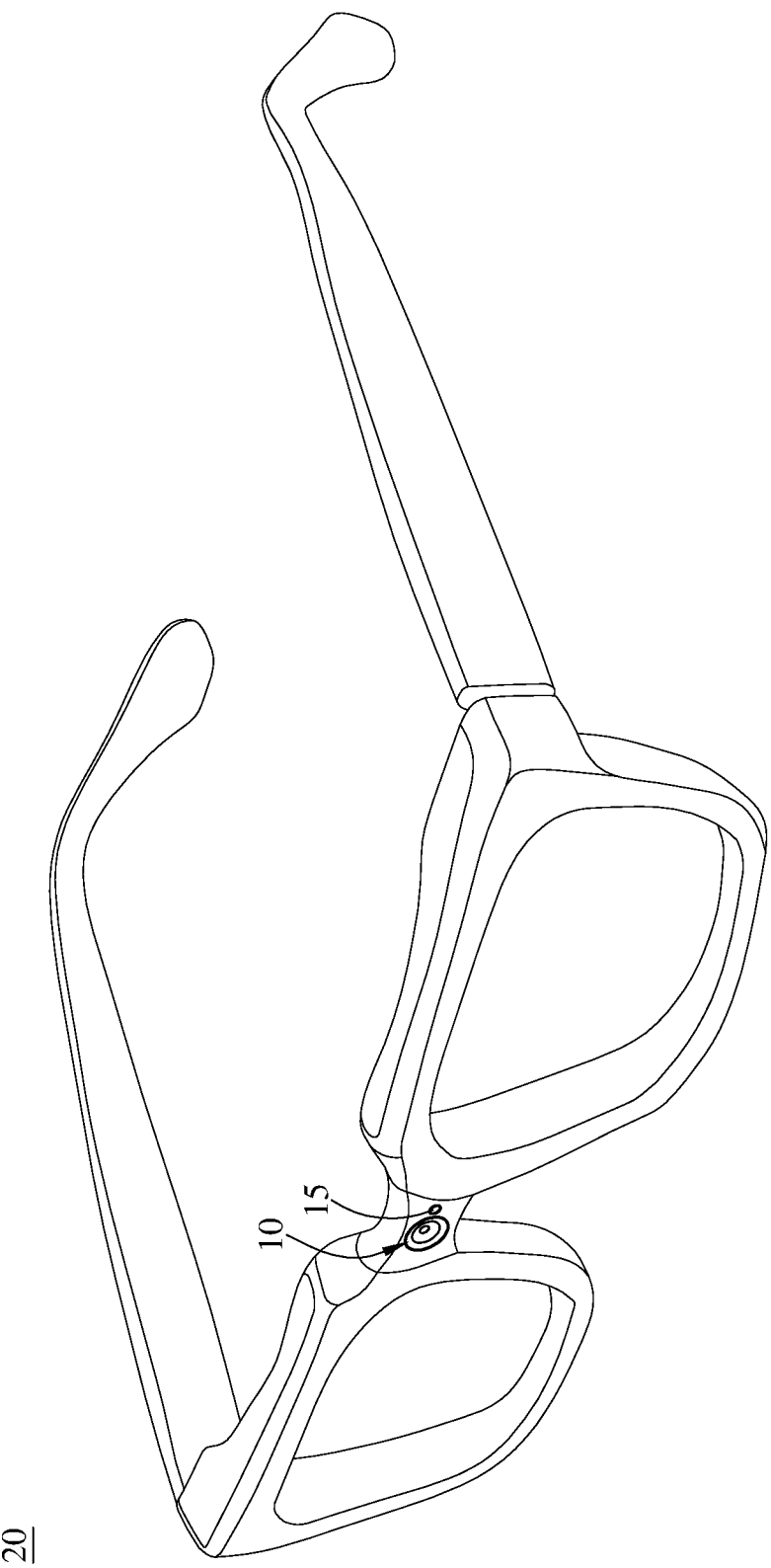
FIG. 19 is a perspective view of yet another electronic device of the present disclosure.
Figure 20:
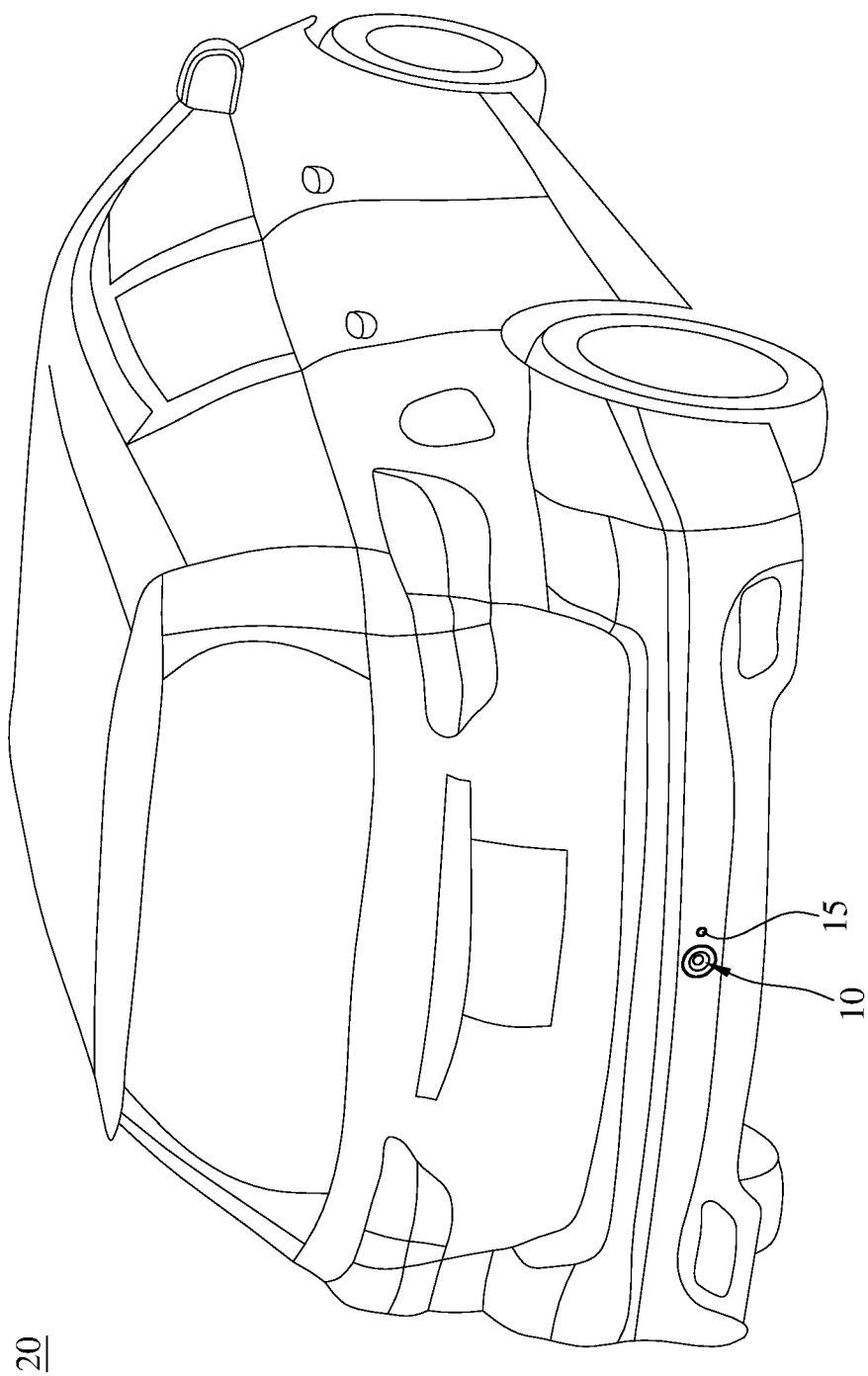
FIG. 20 is a perspective view of yet still another electronic device of the present disclosure.
Figure 21:
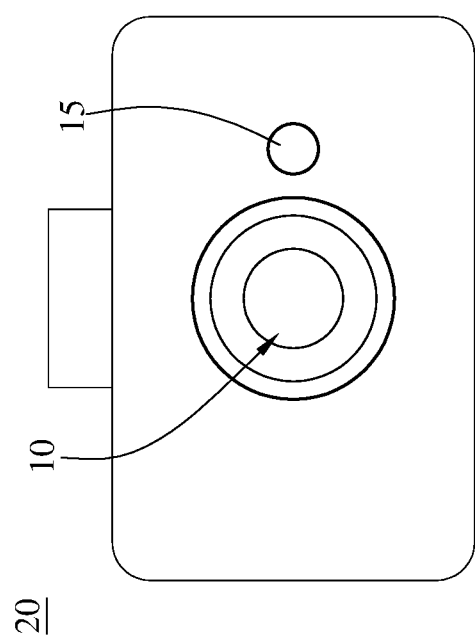
FIG. 21 is a perspective view of yet still another electronic device of the present disclosure.

According to the present disclosure, the aforementioned image capturing unit 10 is not limited to be applied to a net surveillance device. The image capturing unit 10 can be applied to electronic devices, such as a smartphone (FIG. 17), a tablet (FIG. 18), a wearable device (FIG. 19), a vehicle backup camera (FIG. 20) or a dashboard camera (FIG. 21). In some embodiments, the electronic device can further include, but not limited to, a control unit, a display unit, a storage unit, a random access memory unit (RAM) or a combination thereof.

According to the present disclosure, the photographing optical lens assembly can be optionally applied to optical systems with a movable focus. Furthermore, the photographing optical lens assembly features good capability in aberration corrections and high image quality, and can be applied to 3D (three-dimensional) image capturing applications, in products such as such as advanced driver assistance systems (ADAS), lane departure warning systems (LDWS), blind spot detection systems, multiple lens devices, smart televisions, digital cameras, drones, sport cameras, mobile devices, network surveillance devices, motion sensing input devices and other electronic imaging devices. The aforementioned electronic devices are only exemplary for showing the image capturing unit of the present disclosure installed in an electronic device and are not limited thereto, and other electronic imaging devices.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising five lens elements, the five lens elements being, in order from an object side to an image side:
   a first lens element having an object-side surface being convex in a paraxial region thereof;
   a second lens element;
   a third lens element having an object-side surface being convex in a paraxial region thereof;
   a fourth lens element having an image-side surface being convex in a paraxial region thereof; and
   a fifth lens element having an image-side surface being concave in a paraxial region thereof, and the image-side surface of the fifth lens element having at least one convex shape in an off-axis region thereof;
   wherein an Abbe number of the third lens element at a wavelength of helium d-line is Vd3, an Abbe number of the fourth lens element at the wavelength of helium d-line is Vd4, an Abbe number of the fifth lens element at the wavelength of helium d-line is Vd5, an axial distance between the object-side surface of the first lens element and the image-side surface of the fifth lens element is TD, an axial distance between the image-side surface of the fifth lens element and an image surface is BL, and the following conditions are satisfied:

$15 < Vd3+Vd4+Vd5 < 75$; and $3.50 < TD/BL < 20$.

2. The photographing optical lens assembly of claim 1, wherein the second lens element has an image-side surface being convex in a paraxial region thereof.

3. The photographing optical lens assembly of claim 1, wherein the third lens element has an image-side surface being concave in a paraxial region thereof, and the image-side surface of the third lens element has at least one convex shape in an off-axis region thereof.

4. The photographing optical lens assembly of claim 1, wherein the fourth lens element has positive refractive power, and the fifth lens element has negative refractive power.

5. The photographing optical lens assembly of claim 1, wherein the axial distance between the object-side surface of the first lens element and the image-side surface of the fifth lens element is TD, the axial distance between the image-side surface of the fifth lens element and the image surface is BL, and the following condition is satisfied:

$5.0 < TD/BL < 10.0$.

6. The photographing optical lens assembly of claim 1, wherein half of a maximum field of view of the photographing optical lens assembly is HFOV, a focal length of the photographing optical lens assembly at the wavelength of helium d-line is fd, an entrance pupil diameter of the photographing optical lens assembly is EPD, and the following conditions are satisfied:

$0.10<\tan(HFOV)<0.70$; and $0.5<fd/EPD<1.60$.

7. The photographing optical lens assembly of claim 1, wherein an Abbe number of the first lens element at the wavelength of helium d-line is Vd1, and the following condition is satisfied:

$40<Vd1<80$.

8. The photographing optical lens assembly of claim 1, wherein the axial distance between the image-side surface of the fifth lens element and the image surface is BL, a sum of axial distances between each of all adjacent lens elements of the photographing optical lens assembly is ΣAT, and the following condition is satisfied:

$BL/\Sigma AT<1.50$.

9. The photographing optical lens assembly of claim 1, wherein a focal length of the second lens element at the wavelength of helium d-line is fd2, a focal length of the third lens element at the wavelength of helium d-line is fd3, and the following condition is satisfied:

$|fd3/fd2|<1.0$.

10. The photographing optical lens assembly of claim 1, wherein an entrance pupil diameter of the photographing optical lens assembly is EPD, a maximum image height of the photographing optical lens assembly is ImgH, and the following condition is satisfied:

$1.0<EPD/\text{ImgH}$.

11. The photographing optical lens assembly of claim 1, wherein the photographing optical lens assembly is operated within a wavelength range of 1200 nm to 1800 nm.

12. An electronic device, comprising:
    the photographing optical lens assembly of claim 1;
    a light source configured to generate light within a wavelength range of 1200 nm to 1800 nm; and
    an image sensor disposed on the image surface of the photographing optical lens assembly.

* * * * *